(12) United States Patent
Bertram et al.

(10) Patent No.: US 9,542,849 B1
(45) Date of Patent: Jan. 10, 2017

(54) RISK-BASED FLIGHT PATH DATA GENERATING SYSTEM, DEVICE, AND METHOD

(71) Applicant: ROCKWELL COLLINS, INC., Cedar Rapids, IA (US)

(72) Inventors: Joshua R. Bertram, Ames, IA (US); Thomas L. Vogl, Cedar Rapids, IA (US); Brian R. Wolford, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/814,760

(22) Filed: Jul. 31, 2015

(51) Int. Cl.
G08G 5/00 (2006.01)
G05D 1/00 (2006.01)
G05D 1/10 (2006.01)

(52) U.S. Cl.
CPC .............. *G08G 5/003* (2013.01); *G05D 1/0011* (2013.01); *G05D 1/101* (2013.01); *G08G 5/0069* (2013.01)

(58) Field of Classification Search
CPC ....... G01C 23/00; G01C 23/005; G05D 1/101; G05D 1/0011; G08G 5/003; G08G 5/0034; G08G 5/0039; G08G 5/0069
See application file for complete search history.

(56) References Cited

U.S. PATENT DOCUMENTS

| | | | | |
|---|---|---|---|---|
| 5,631,640 A | * | 5/1997 | Deis | F41G 7/343 340/961 |
| 6,085,147 A | * | 7/2000 | Myers | G01C 21/3453 342/33 |
| 6,175,803 B1 | * | 1/2001 | Chowanic | G01C 21/34 340/988 |
| 6,289,277 B1 | * | 9/2001 | Feyereisen | G01C 21/005 340/945 |
| 6,940,426 B1 | * | 9/2005 | Vaida | B64D 45/0015 340/945 |

(Continued)

OTHER PUBLICATIONS

Babel, Luitpold, "Three-dimensional route planning for unmanned aerial vehicles in a risk environment", Journal of Intelligent and Robotic Systems, vol. 71 Issue 2, Aug. 2013, pp. 255-269.*

(Continued)

*Primary Examiner* — Behrang Badii
*Assistant Examiner* — David Testardi
(74) *Attorney, Agent, or Firm* — Daniel M. Barbieri; Donna P. Suchy; Angel N. Gerdzhikov

(57) ABSTRACT

A system, device, and method for generating and employing risk-based flight path data are disclosed. The system for employing risk-based flight path data may include one or more one avionics systems and/or remote aircraft operator systems configured to receive risk-based flight path data from a route generator (RG). The RG may acquire navigation data representative of one or more waypoints, acquire risk object data based upon the navigation data, determine the risk-based flight path data representative of a risk-based flight path as a function of the acquired navigation data, the acquired risk data, and a route generating algorithm, and provide the flight path data to the one or more avionics systems and/or remote aircraft operator systems. In some embodiments, the risk object data may include a plurality of risk clearance altitudes. In other embodiments, the risk object data may include a plurality of risk clearance elevations.

20 Claims, 30 Drawing Sheets

(56) References Cited

U.S. PATENT DOCUMENTS

| | | | | |
|---|---|---|---|---|
| 7,194,353 | B1* | 3/2007 | Baldwin | G01C 21/00 701/301 |
| 7,848,879 | B2* | 12/2010 | Herman | G05D 1/0202 701/3 |
| 8,234,068 | B1* | 7/2012 | Young | G01C 21/00 244/175 |
| 8,548,728 | B2* | 10/2013 | Bacabara | G01C 23/00 701/3 |
| 8,725,417 | B1* | 5/2014 | Young | G08G 5/0052 701/528 |
| 8,843,303 | B1* | 9/2014 | Young | G08G 5/0039 701/122 |
| 8,868,257 | B2* | 10/2014 | Kirchhofer | G01C 23/00 340/990 |
| 8,965,601 | B1 | 2/2015 | Barber | |
| 2006/0031004 | A1* | 2/2006 | Lundberg | G01C 21/3461 701/533 |
| 2006/0184294 | A1* | 8/2006 | Ma | G01C 23/00 701/25 |
| 2007/0285283 | A1* | 12/2007 | Bitar | G01C 23/00 340/963 |
| 2008/0208474 | A1* | 8/2008 | Wilson | G06N 7/00 702/3 |
| 2010/0036599 | A1* | 2/2010 | Froeberg | G01C 21/3461 701/532 |
| 2010/0106419 | A1* | 4/2010 | Flotte | G08G 5/045 701/301 |
| 2014/0249744 | A1* | 9/2014 | Andersson | G01C 21/3415 701/410 |
| 2016/0123751 | A1* | 5/2016 | Andersson | G01C 21/3415 701/411 |

OTHER PUBLICATIONS

Culligan, Kieran Forbes, "Online trajectory planning for UAVs using mixed integer linear programming", Master's Thesis, Massachusetts Institute of Technology, Aug. 2006, 100 pages.*

De Filippis, Luca et al., "A minimum risk approach for path planning of UAVs", Journal of Intelligent and Robotic Systems, vol. 61 Issues 1-4, Jan. 2011, pp. 203-219.*

Ma, Cedric S. et al., "MILP Optimal Path Planning for Real-Time Applications", Proceedings of the 2006 American Control Conference (IEEE), Minneapolis, Minnesota, USA, Jun. 14-16, 2006, Paper FrB02.2, pp. 4945ff.*

Mattei, Massimiliano et al., "Smooth Flight Trajectory Planning in the Presence of No-Fly Zones and Obstacles", Journal of Guidance, Control, and Dynamics, vol. 33, No. 2, Mar.-Apr. 2010, pp. 454ff.*

Mittal, Shashi et al., "Three dimensional offline path planning for UAVs using multiobjective evolutionary algorithms", 2007 IEEE Congress on Evolutionary Computation (CES 2007), Sep. 25-28, 2007, pp. 3195ff.*

* cited by examiner

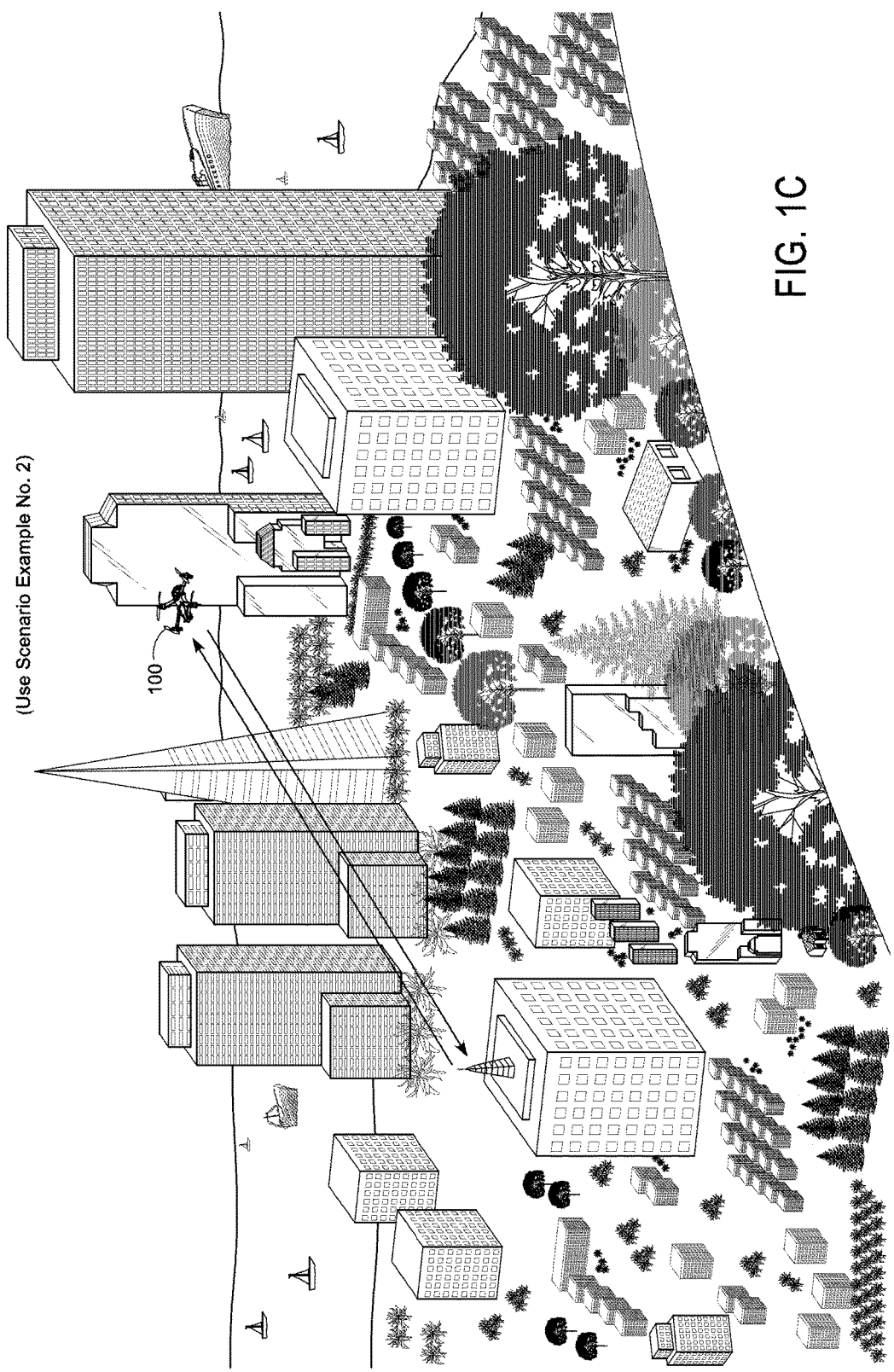

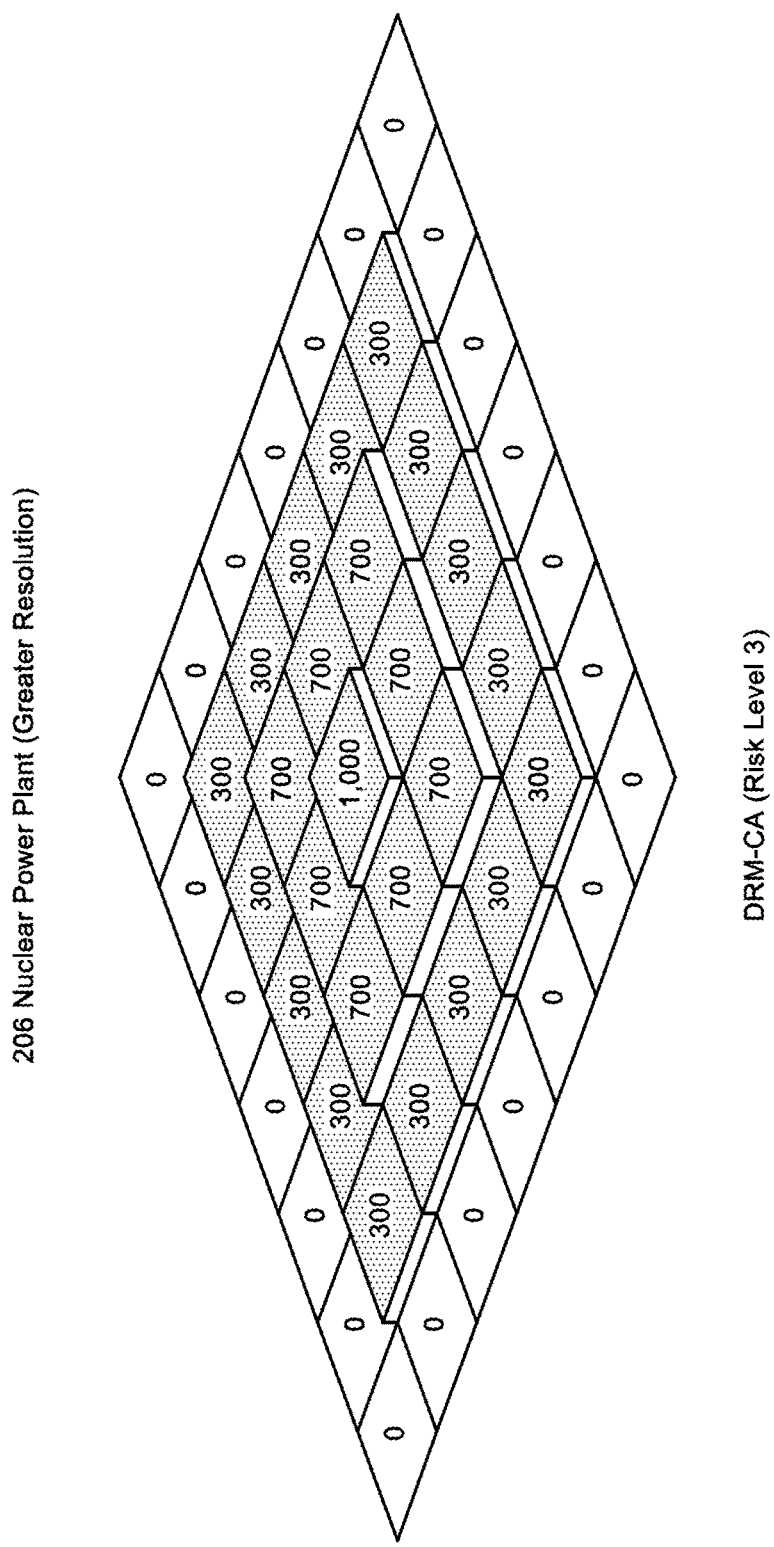

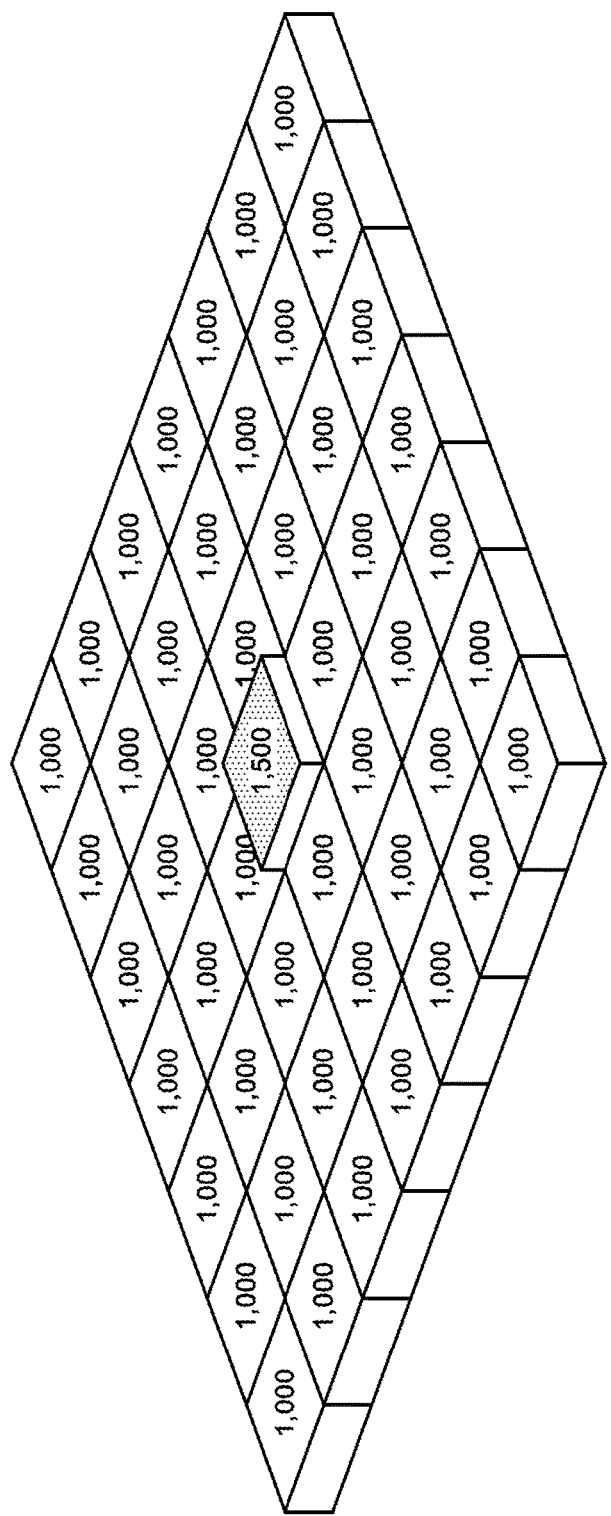

RISK-BASED FLIGHT PATH DATA GENERATING SYSTEM, DEVICE, AND METHOD

BACKGROUND

Description of the Related Art

The market of Unmanned Aerial Vehicles (singularly, UAV) is developing. As it develops, there is an expectation that a UAV will be subjected to regulatory constraints in their areas of operation, including standard airspace restrictions such as no-fly zones over military installations as well as restrictions to maintain safe distances from airports and populated areas.

Operators of UAVs such as movie studios, commercial photographers, shipping companies, and those who perform survey and monitoring operations may encounter new risks from which they may want to minimize their liability. Each of them face challenges to minimize the danger to people and property on the ground to ensure that operating a UAV does not create a danger.

Generally speaking, aircraft depart from and arrive at airports having runways. Pilots and/or operators of aircraft may determine a flight plan and file it with an aviation-governing authority such as the United States Federal Aviation Administration. Once a flight plan is approved, the aircraft is expected to fly the flight path of the approved flight plan. These aircraft, however, may be large in size when compared with smaller UAVs. Because of the smaller size, the number of areas to which UAVs have access has grown exponentially, thereby making it possible to fly UAVs in areas that are not available to even the smaller-sized general aviation aircraft and helicopters. Because the number of areas in which UAVs may operate has grown, the number of possible flight paths has also grown.

SUMMARY

Embodiments of the inventive concepts disclosed herein are directed to a system, device, and method for generating and employing risk-based flight path data. The risk-based flight path may assist an operator of a UAV to avoid high-risk areas or to manage a UAV operating system commensurate to a level of risk.

In one aspect, embodiments of the inventive concepts disclosed herein are directed to a system for employing risk-based flight path data. The system may include at least one of either an avionics system and/or remote aircraft operator system. The risk-based flight path employment system could be configured to receive risk-based flight path data from a route generator (RG) configured (or programmed) to perform a method of generating a risk-based flight path data to impart functionality to at least one avionics system or remote aircraft operator system.

In a further aspect, embodiments of the inventive concepts disclosed herein are directed to a device for generating data representative of a risk-based flight path. The device may include the RG and may be configured to perform a method of generating risk-based flight path data.

In a further aspect, embodiments of the inventive concepts disclosed herein are directed to a method for generating data representative of a risk-based flight path. When properly configured, the RG may acquire navigation data representative of at least a flight plan, acquire risk object data based upon the navigation data, determine the risk-based flight path data representative of a risk-based flight path as a function of the acquired navigation data, the acquired risk data, and a route generating algorithm, and provide the flight path data to at least one of either an avionics system and/or remote aircraft operator system. In some embodiments, the risk object data may include a plurality of risk clearance altitudes of a plurality of cells of a digital risk model. In other embodiments, the risk object data may include a plurality of risk clearance elevations of a plurality of cells of a digital risk model.

BRIEF DESCRIPTION OF THE DRAWINGS

FIG. 1C depicts a second use scenario in which the risk-based flight path data generating system is employable.

FIG. 7C depicts a DRM-CA (Risk Level 3) of the nuclear power plant.

FIG. 8A depicts a DRM-E (Risk Level 1) of the nuclear power plant.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
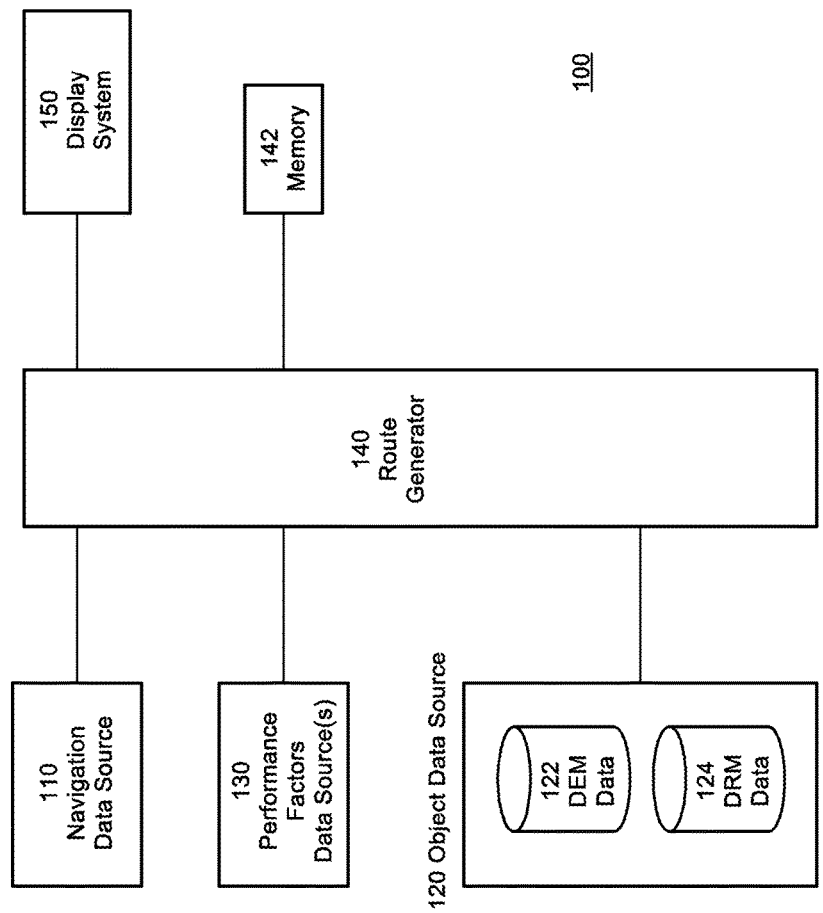
FIG. 1A depicts a functional block diagram of an exemplary embodiment of risk-based flight path data generating system.

FIG. 1A depicts a functional block diagram of a risk-based flight path data generating system 100 suitable for implementation of the techniques described herein. The system 100 may include a navigation data source 110, an object data source 120, a performance factors data source 130, a route generator (RG) 140, and a display system 150.

The navigation data source 110 could include any source(s) which provides navigation data information in an aircraft. The navigation data source 110 may include, but is not limited to, an air/data system, an attitude heading reference system, an inertial guidance system (or inertial reference system), and a global navigation satellite system (or satellite navigation system). The navigation data source 110 could provide navigation data including, but not limited to, geographic position, altitude, heading, attitude, ground speed, air speed, date, and/or time of day. Aircraft position may be comprised of geographic position (e.g., latitude and longitude coordinates) and altitude, and ground track may be derived from either geographic position, aircraft position, or both.

The navigation data source 110 could include a flight management system (FMS) known to those skilled in the art for performing a variety of functions performed to help a pilot with the management of the flight. These functions could include receiving a flight plan and constructing a lateral and vertical flight path from the flight plan. A pilot could create a flight plan by entering waypoints stored in a navigation database or select a flight plan stored in a database of the FMS; also, the flight plan could be received and loaded into the FMS automatically through a datalink system known to those skilled in the art. Also, a flight plan may be modified at any time.

In addition, the FMS 138 could receive data input from other aircraft systems including, but not limited to, data representative of one or more flight modes and/or parameters selected and/or engaged by the pilot through a pilot interface system (e.g., a flight control panel) and used for engaging an aircraft's autoflight system. An autoflight system could include systems such as, but is not limited to, a flight director (FD) system, an autopilot system, and an autothrottle system. In addition, the FMS could provide data representative of a flight plan to other aircraft systems including, but not limited to, an autoflight system. Also, data representative of the flight plan may used as a basis for presenting a highway in the sky (HITS) by the display system 150. An example of a HITS has been described by Barber in a U.S. Pat. No. 8,965,601 entitled "System, Module, and Method for Presenting a Flight Director-De-pendent HITS Pathway on an Aircraft Display," a publication that is incorporated by reference in its entirety.

As embodied herein, aircraft could mean any vehicle which is able to fly through the air or atmosphere including, but not limited to, a manned aerial vehicle and an unmanned aerial vehicle (UAV) remotely operated by a pilot such as, but not limited to, civilian and military drones; lighter than air vehicles; and heavier than air fixed-wing and rotary-wing vehicles. Although the following discussion will be drawn to UAV(s) operated remotely, the inventive concepts disclosed herein may be applied to any aircraft flying being two points.

The object data source 120 could include one or more sources of object data that includes a digital elevation model (DEM) data source 122 and a digital risk model (DRM) data source 124. The DEM data source 122 could include a terrain database comprised of elevation of terrain cells and an obstacles database comprised of elevations of man-made structures or obstacles as discussed by Young et. al. in U.S. Pat. No. 8,234,068 entitled "System, Module, and Method of Constructing a Flight Path Used by an Avionics System" (the Young reference), which is incorporated herein by reference in its entirety.

It should be further noted that the object data source 120 could include any digital memory storage device or RG-readable media (i.e., media readable by the RG 140) including, but not limited to, a plurality of types of RAMs, a plurality of types of ROM, CD, DVD, hard disk drive, diskette, solid-state memory, PCMCIA or PC Card, secure digital cards, compact flash cards, and/or memory currently in development that is suitable for performing the embodiments disclosed herein. Data included in the object data source 120 could be loaded while an aircraft is on the ground or in flight and provided manually or automatically through an aircraft system capable of receiving and/or providing such manual or automated data. The object data source 120 employed herein may be a stand-alone database or a combination of databases.

Figure 3A:
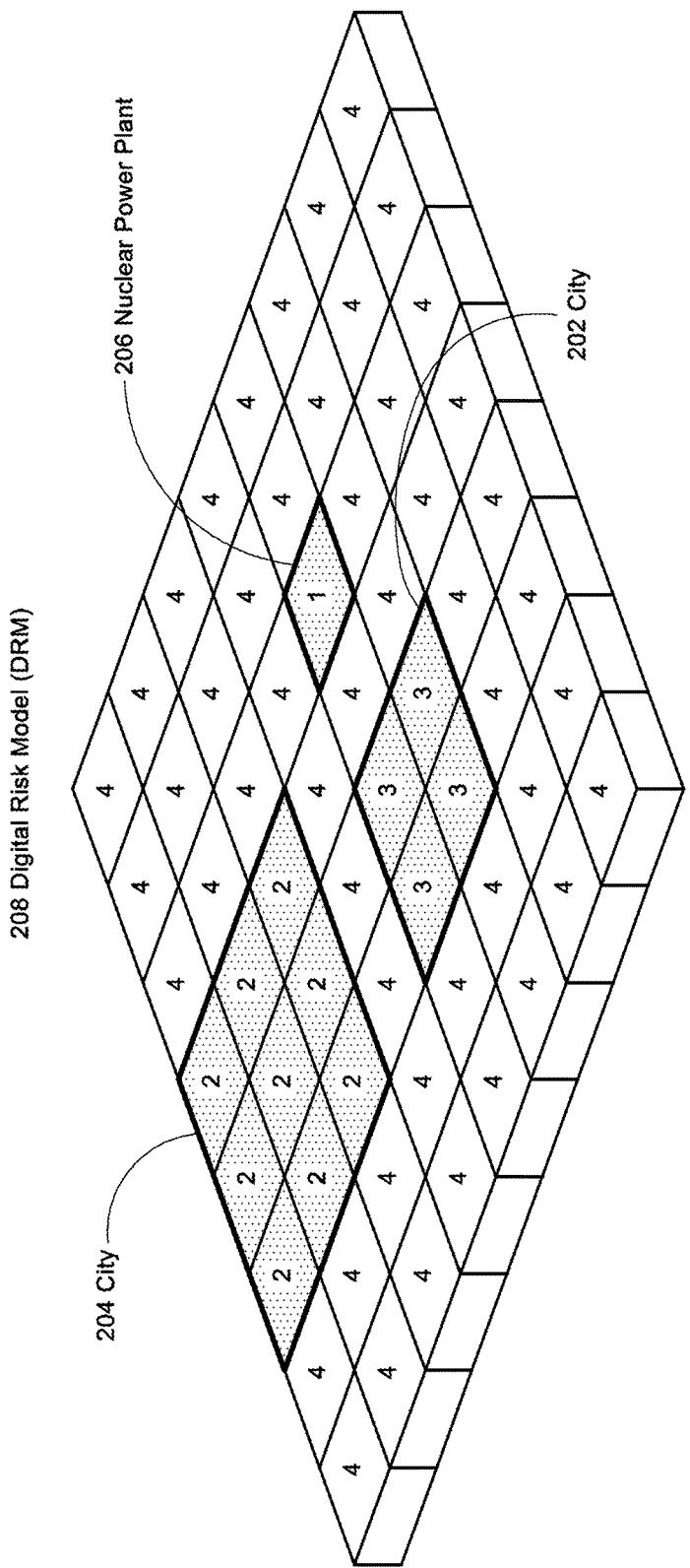
FIG. 3A depicts a digital risk model (DRM) associated with the DEM.
Figure 3B:
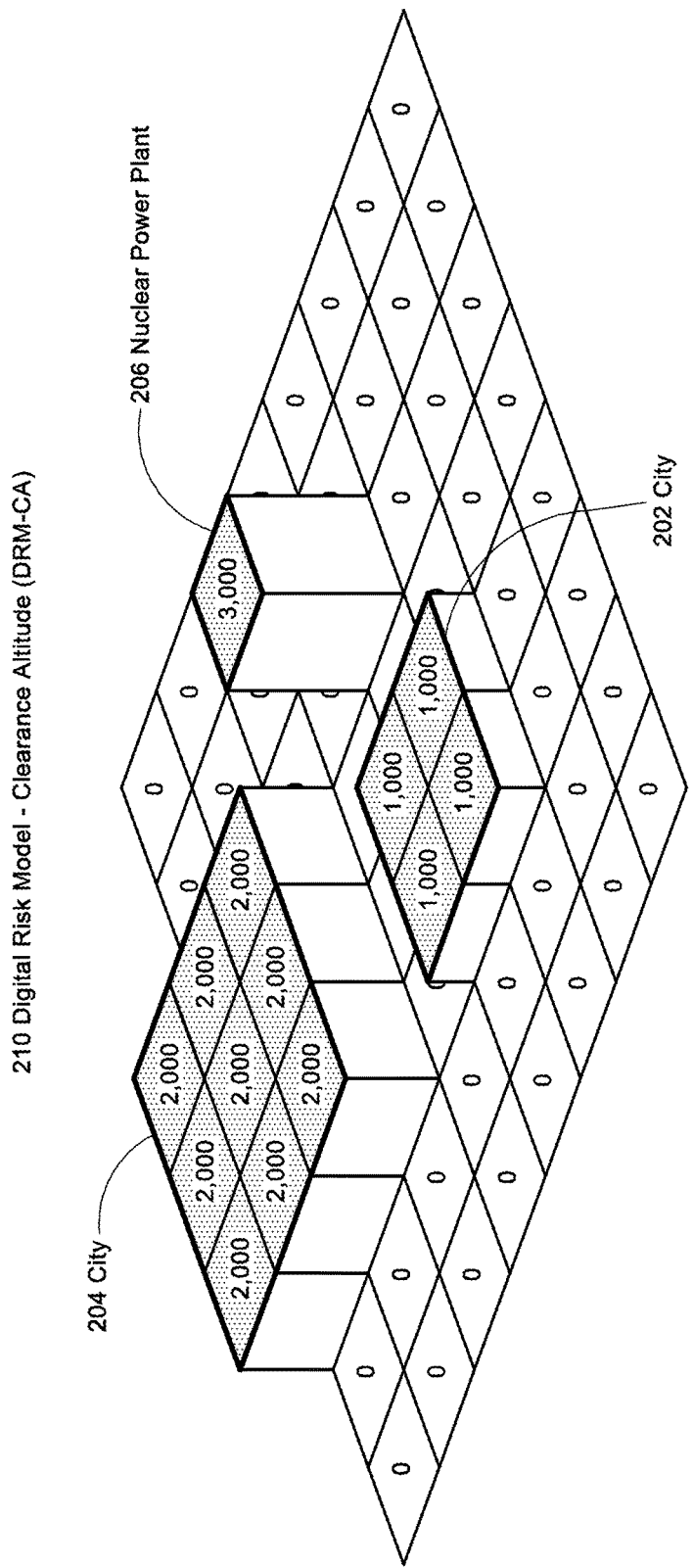
FIG. 3B depicts a plurality of risk clearance altitude cells of a digital risk model (DRM-CA) associated with the DRM.
Figure 3C:
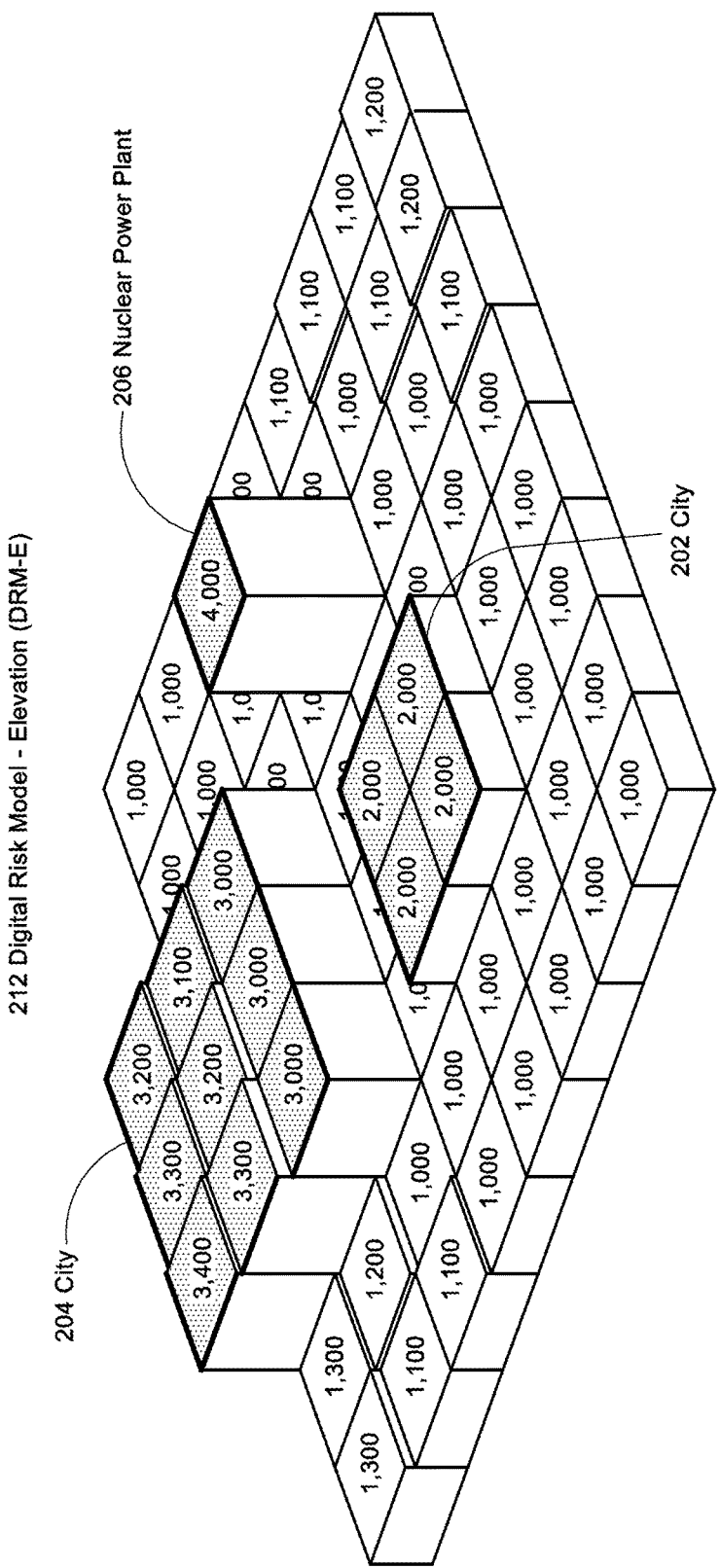
FIG. 3C depicts a plurality of risk elevation cells of a digital risk model (DRM-E) associated with the DRM.

The DRM data source 124 could include data associated with a DRM as disclosed herein. Referring now to FIG. 3A through 3C, exemplars of a DRM 208, a digital risk model of clearance altitudes (DRM-CA) 210, and a digital risk model of elevations (DRM-E) are illustrated. The DRM 208, the DRM-CA 210, and the DRM-E 212 could be developed by those concerned with risks and costs associated with operations of a UAV such as, but not limited to, an owner and/or operator of a UAV, an aviation-governing authority such as the United States Federal Aviation Administration (FAA), manufacturers and/or vendors of a UAV and/or any component thereof, and an insurer or insurance company providing one or more types of insurance coverages to the owner and/or operator of the UAV. Costs associated with operations of a UAV could be costs associated with harm or injuries to people and/or damages of object(s) located on the ground caused by controlled- or uncontrolled-flight of the UAV into the object(s).

A basis or bases for which a risk model or models may be developed could depend upon one or many risk-determining factors. For the purpose of illustration and not of limitation, a few of them are discussed herein. Although the following discussion is drawn to a limited number of possible risk-determining factors, the inventive concepts disclosed herein are not limited to just these.

Possible risk-determining factors could include a total energy arising from UAV operations, where total energy could be compromised of potential energy and kinetic energy. Potential energy could be measured as a function of weight and height, where weight could be assumed to be a maximum operating weight of the UAV and height could be assumed to a maximum operating altitude of the UAV. Kinetic energy could be measured as a function of weight and speed, where speed could be assumed to be a maximum operating speed of the UAV or a maximum speed that could be attained should the UAV enter an uncontrolled descent. For UAVs operating at a relatively high energy level(s), costs associated with harm or injuries and/or damage(s) resulting from controlled- or uncontrolled-flight of the UAV into people and/or ground object(s), respectively, could be significantly higher than those associated with UAVs operating a relatively low energy level(s).

The performance factors data source 130 could be comprised of any source or combination of sources—including the navigation data source 110—that could provide performance factors from which real-time aircraft performance could be defined. For example, the performance factors data source 130 could be comprised of one or more aircraft systems or components thereof. The performance factors data source 130 could include real-time system or sensor data, signal input from a plurality of aircraft systems or sensors, and information from any database or source. Detailed discussions of the performance factors and the employment thereof have been disclosed (and discussed as input factors) in the Young reference. In some embodiments, the performance factors data source 130 could be configured to provide performance factors data to the RG 140 for subsequent processing as discussed herein.

The RG 140 could include any electronic data processing unit which executes software or computer instruction code that could be stored, permanently or temporarily, in a digital memory storage device or a non-transitory computer-readable media (generally, memory 142) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The RG 140 may be driven by the execution of software or computer instruction code containing algorithms developed for the specific functions embodied herein. The RG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the RG 140 could also include more than one electronic data processing unit. In some embodiments, the RG 140 could be a processor(s) used by or in conjunction with any other system of the aircraft including, but not limited to, the navigation data source 110, the object data source 120, the performance factors data source 130, and the display system 150.

In some embodiments, the terms "programmed" and "configured" are synonymous. The RG 140 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the RG 140 via a physical or a virtual computer port. The RG 140 may be programmed or configured to execute the method discussed in detail below. The RG 140 may be programmed or configured to provide output data to various systems and/or units including, but not limited to, the display system 150.

The display system 150 may include one or more display units configured to present information visually to the pilot. The display unit could be part of an Electronic Flight Information System (EFIS) and could be comprised of, but is not limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets), and/or user-wearable devices such as wrist- and head-mounted devices). The display system 150 may be configured to present one or more display(s) or image(s). In some embodiments, the terms "display" and "image" are interchangeable and treated synonymously.

Figure 1B:
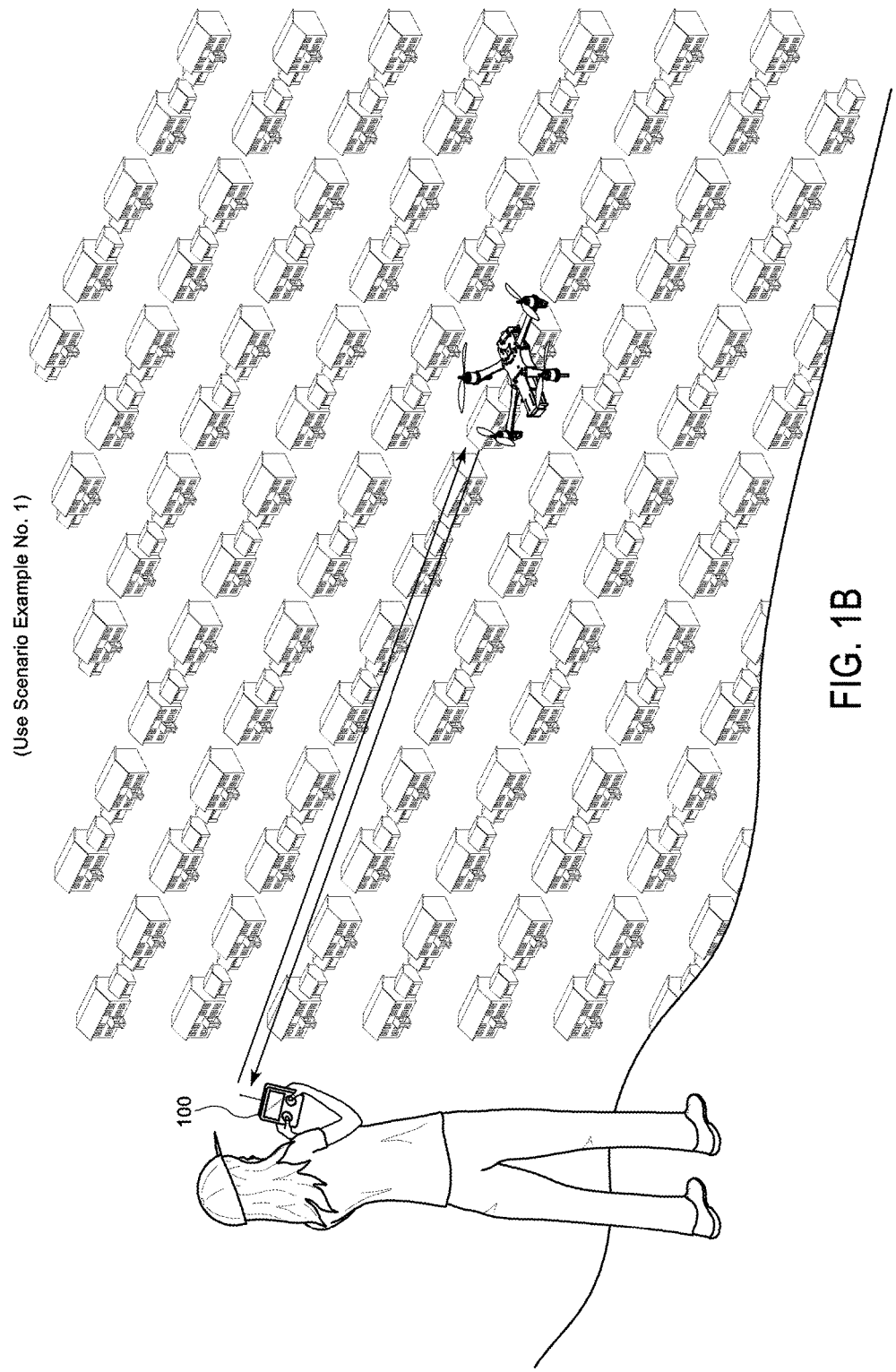
FIG. 1B depicts a first use scenario in which the risk-based flight path data generating system is employable.
Figure 1D:
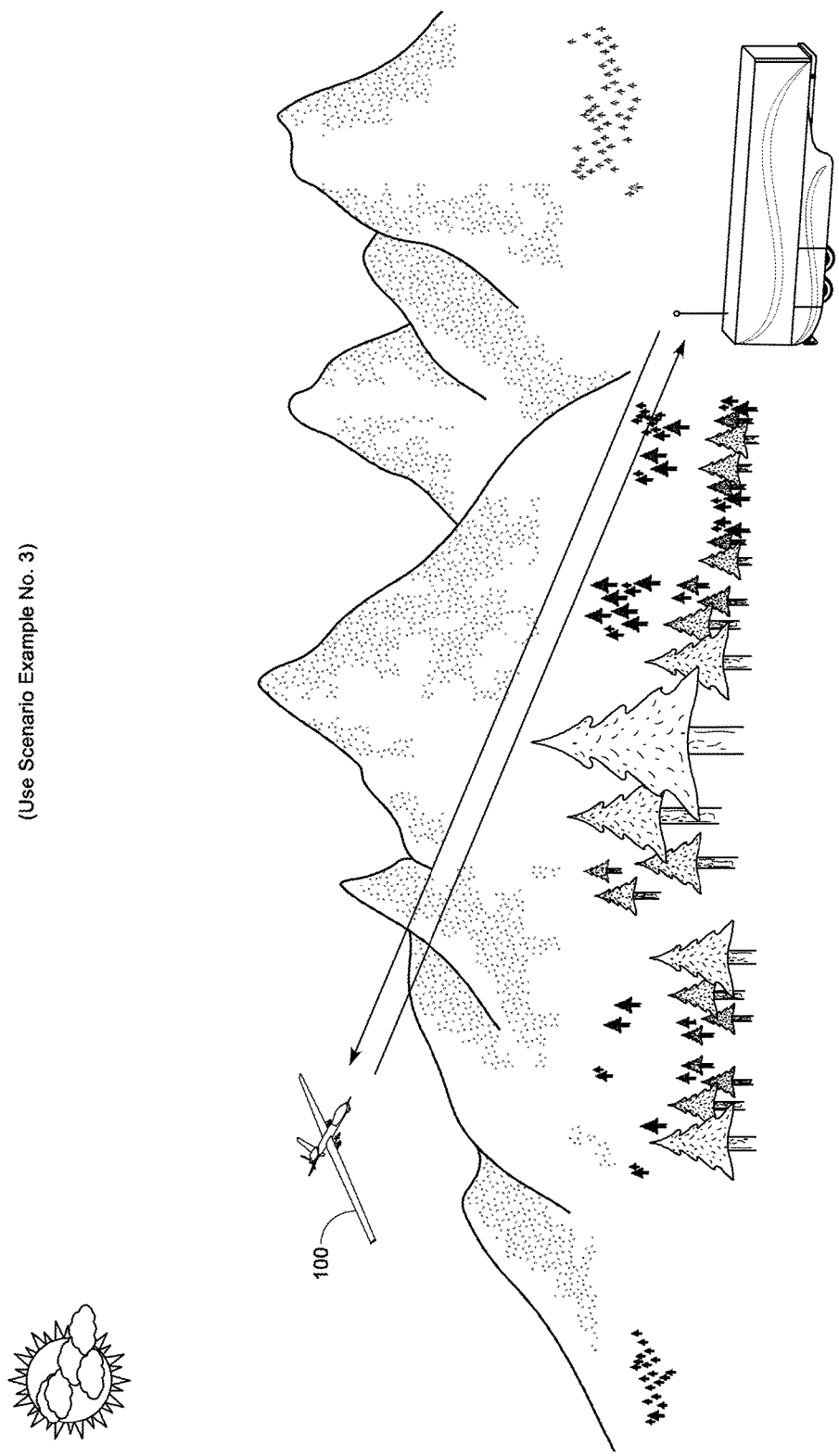
FIG. 1D depicts a third use scenario in which the risk-based flight path data generating system is employable.

FIGS. 1B through 1D, inclusive, depict a few use scenarios in which a risk-based flight path data generating system may be employed. In FIG. 1B, a professional photographer has been employed to take pictures of a house or a professional videographer employed to film a backyard wedding ceremony, where a camera in installed on the UAV shown in FIG. 1B. In this use scenario, the system 100 may be installed in a handheld controller (i.e., a remote aircraft operator system) for controlling the UAV, where a path represented by the risk-based flight path data may be presented to the viewer on a display of the handheld controller as she flies the UAV.

In FIG. 1C, the system 100 may be used by a package delivery company conducting business in San Francisco, Calif. which uses a UAV as a vehicle for delivering packages. In this use scenario, the system 100 may be installed in a building of the package delivery in which remote aircraft operator system is housed and from which an operator of the company may control the UAV while viewing the risk-based flight path represented by the risk-based flight path data generated by system 100. Additionally, the system 100 may be installed in the UAV configured with at least one avionics system such as, but not limited to, an autoflight system that could be configured to receive risk-based flight path data generated by system 100.

In FIG. 1D, the system 100 may be used by a military unit conducting aerial surveillance or reconnaissance of suspected enemy activity on the other side of the hills. In this use scenario, the system 100 may be installed in a mobile control station that is manned by personnel who may control the UAV while viewing the risk-based flight path represented by the risk-based flight path data generated by system 100. Additionally, similar to the UAV of FIG. 1C, the system 100 may be installed in the UAV configured with at least one avionics system configured to receive and employ the risk-based flight path data generated by system 100.

Figure 2:
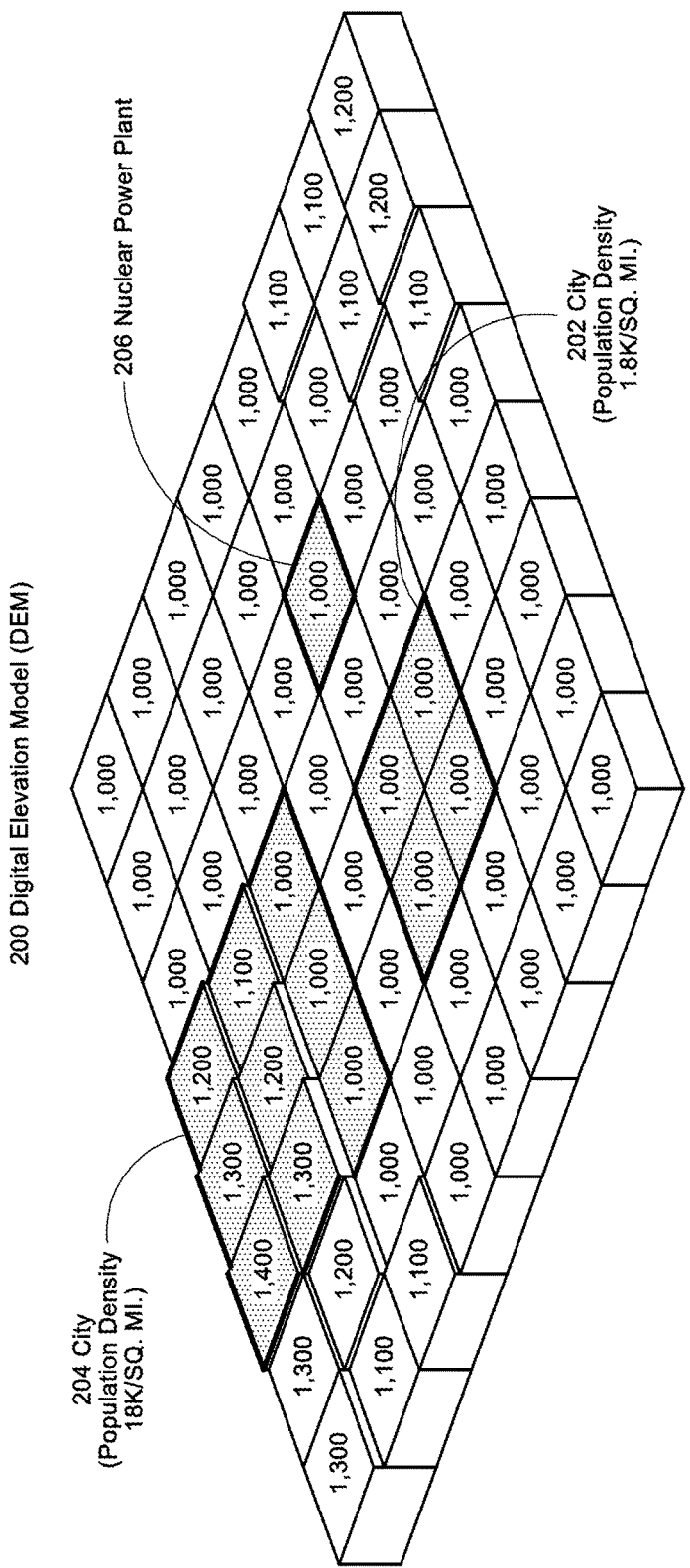
FIG. 2 depicts an exemplary digital elevation model (DEM).

Referring now to FIG. 2, grids or cells of an exemplar DEM 200 are shown for the purpose of illustrating the inventive concepts disclosed herein. Although the DEM 200 is depicted through the use of rectangular cells and blocks, the inventive concepts disclosed herein are not limited to these shapes but could employ any shape(s) that could convey elevation information of a specified location. The DEM 200 includes a plurality of elevations ranging from 1,000 feet mean sea level (MSL) MSL to 1,400 feet MSL, inclusive. In addition, the DEM 200 includes terrain cells encompassing two cities 202 and 204 and a nuclear power plant 206. The city 202 has a population density of 1,800 people per square mile, and the elevation of each terrain cell is 1,000 feet MSL. The city 204 has a population density of 18,000 people per square mile, and the elevations of the terrain cells range from 1,000 feet MSL to 1,400 feet MSL, inclusive. The elevation of the terrain cell encompassing the nuclear power plant 206 is 1,000 feet MSL. Although the size of the cells of the DEM 200 are uniform, some or all of these cells could be divided into smaller cells and/or the DEM data source 122 could include a plurality of resolutions for the same locations to provide a greater amount of detail.

It should be noted that the resolutions (i.e., dimensions of cells) of the DEM 200 are arbitrarily selected for the purpose of illustration only. The inventive concepts disclosed herein include cell resolutions corresponding to a plurality of DEMs including, but not limited to, the DEMs produced by the National Imagery and Mapping Agency (NIMA) of the United States (U.S.) and the U.S. Geological Survey (USGS) such as the Digital Terrain Elevation Data (DTED) Level 0, DTED Level 1 product, DTED Level 2, High Resolution Terrain Information (HRTI) Level 3, HRTI Level 4, and HRTI Level 5 products, the latter product having the highest resolution.

Referring now to FIG. 3A, the DRM 208 includes a plurality of risk level cells associated with the DEM 200, where the numerals 1 through 4 represents the possible ends of a hypothetical scale of risk levels ranging from highest risk level to lowest risk level, respectively, that could be assigned or designated by those concerned with a risk and costs associated with UAV. As observed, a risk level 1 of the DRM 208 has been assigned to a risk level cell of the terrain cell encompassing the nuclear power plant 206, indicative of the highest risk level associated with the DEM 200. Risk level 2 has been assigned to city 204, indicating a lower risk than the risk of the nuclear power plant 206, and risk level 3 has been assigned to city 202, indicative of a lower risk than city 204. For all of the other cells, risk level 4 has been assigned, indicative of the lowest risk level associated with the DEM 200. Although the following discussion is drawn to the use of only four levels of risk, the inventive concepts disclosed herein may include more or fewer levels of a continuous scale of risks.

Referring now to FIG. 3B, the DRM-CA 210 includes a plurality of risk clearance altitude (CA) cells associated with the plurality of risk level cells of the DRM 208, where each risk CA could be assigned or designated by those concerned with a risk and costs associated with UAV. As observed, a risk CA of 3,000 feet above ground level (AGL) has been assigned to a risk level cell associated with risk level 1, a risk CA of 2,000 feet AGL with risk level 2, a risk CA of 1,000 feet AGL with risk level 3, and a risk CA of zero with risk level 4.

Referring now to FIG. 3C, the DRM-E 212 includes a plurality of risk elevation (RE) cells associated with the plurality of risk level cells of the DRM 208 and/or the plurality of risk CA cells of the DRM-CA 210, where the RE of each RE cell could be the sum of an associated terrain cell elevation of the DEM 200 and an associated risk CA of the DRM-CA 210. For example, the RE of the RE cell of the nuclear power plant 206 having risk level 1 is 4,000 feet MSL, the sum of its associated terrain cell elevation of 1,000 feet MSL of the DEM 200 and its associated risk CA of 3,000 AGL of the DRM-CA 210.

Figure 4A:
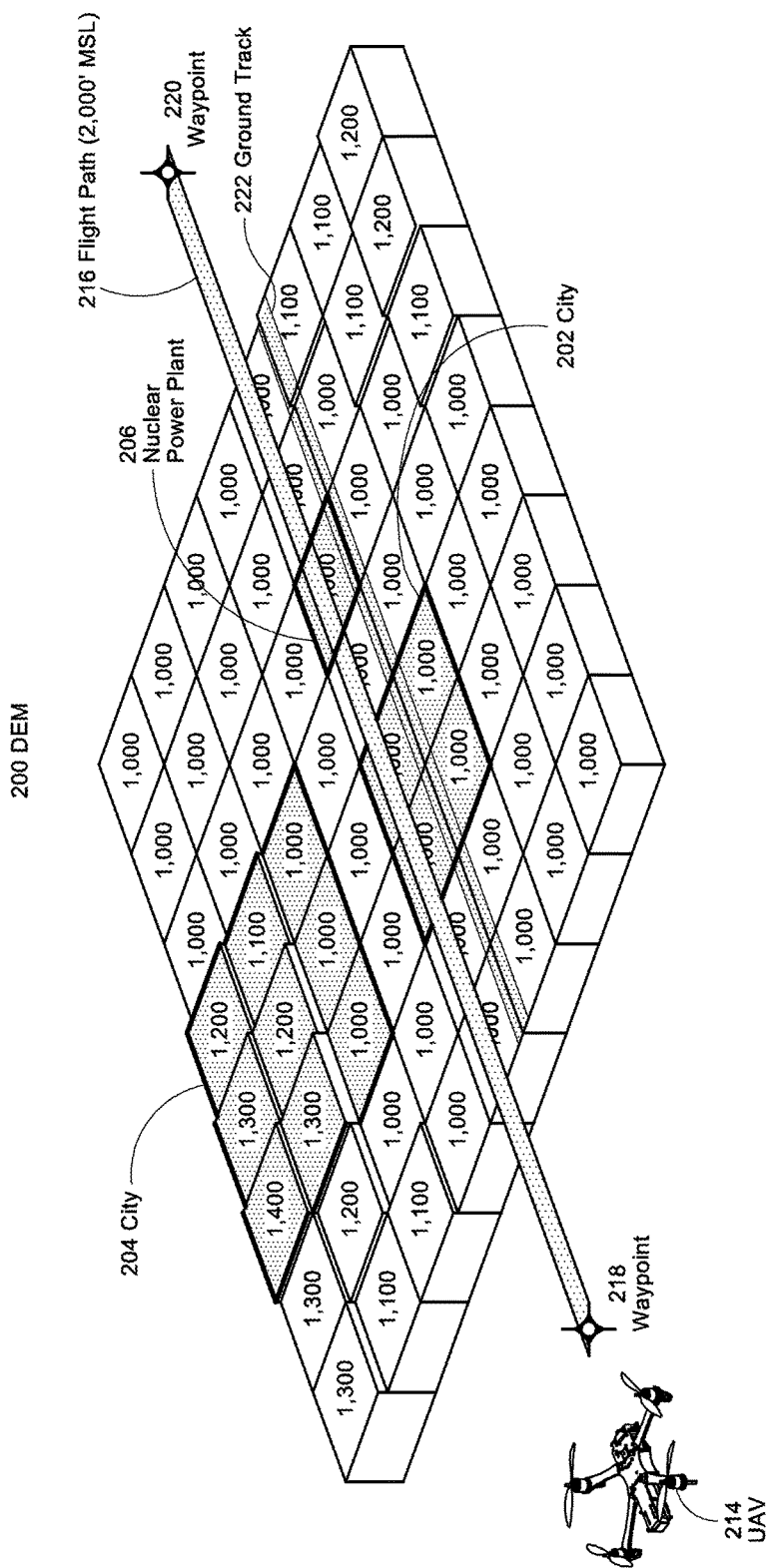
FIG. 4A depicts a UAV and its planned flight path over the DEM.

Some advantages and benefits of embodiments discussed herein are illustrated in FIGS. 4A through 7 by showing examples of how flight path of an aircraft may be employed against a hypothetical DEM and hypothetical DRM-Es. Referring now to FIG. 4A, a UAV 214 is projected to fly above terrain cells encompassed by the DEM 200 on a level flight path 216 at a flying altitude of 2,000 feet MSL between waypoints 218 and 220; a ground track 222 corresponding to the flight path 216 is shown. In some embodiments, the waypoints 218 and/or 220 could be a user- or self-defined waypoint created where one is not known or defined by an aviation-governing authority and/or does not currently exist, but may be created by others concerned with risks and costs associated with operations of a UAV. As observed, the UAV 214 is projected to fly over city 202 and the nuclear power plant 206.

Figure 4B:
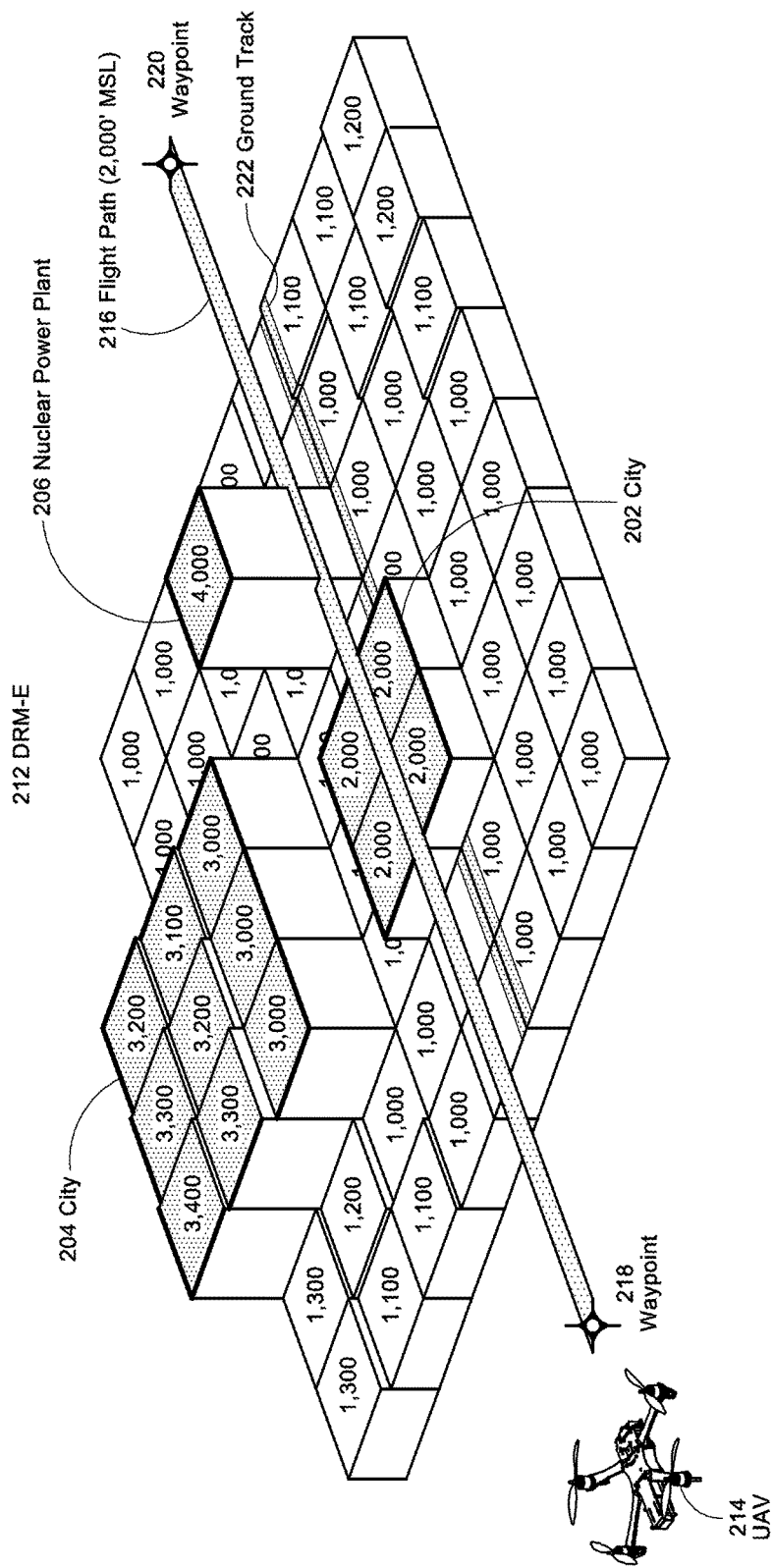
FIG. 4B depicts a UAV and its planned flight path over the DRM-E.

Referring now to FIG. 4B, the flight path 216 is projected with the RE cells of the DRM-E 212. As observed, the flying altitude of 2,000 feet MSL is equal to the RE of each RE cell of city 202; however, the flying altitude is less than the REs of each RE cell of city 204 and the RE cell of the nuclear power plant 206. The RE cell of the nuclear power plant 206 hinders part of the flight path 216, creating a full RE cell that is not traversable. As such, a route generating algorithm (or flight path construction method) may be employed to determine whether another flight path is available to reach the waypoint 220. An example of a route generating algorithm is the flight path construction method disclosed in the Young reference.

Figure 4C:
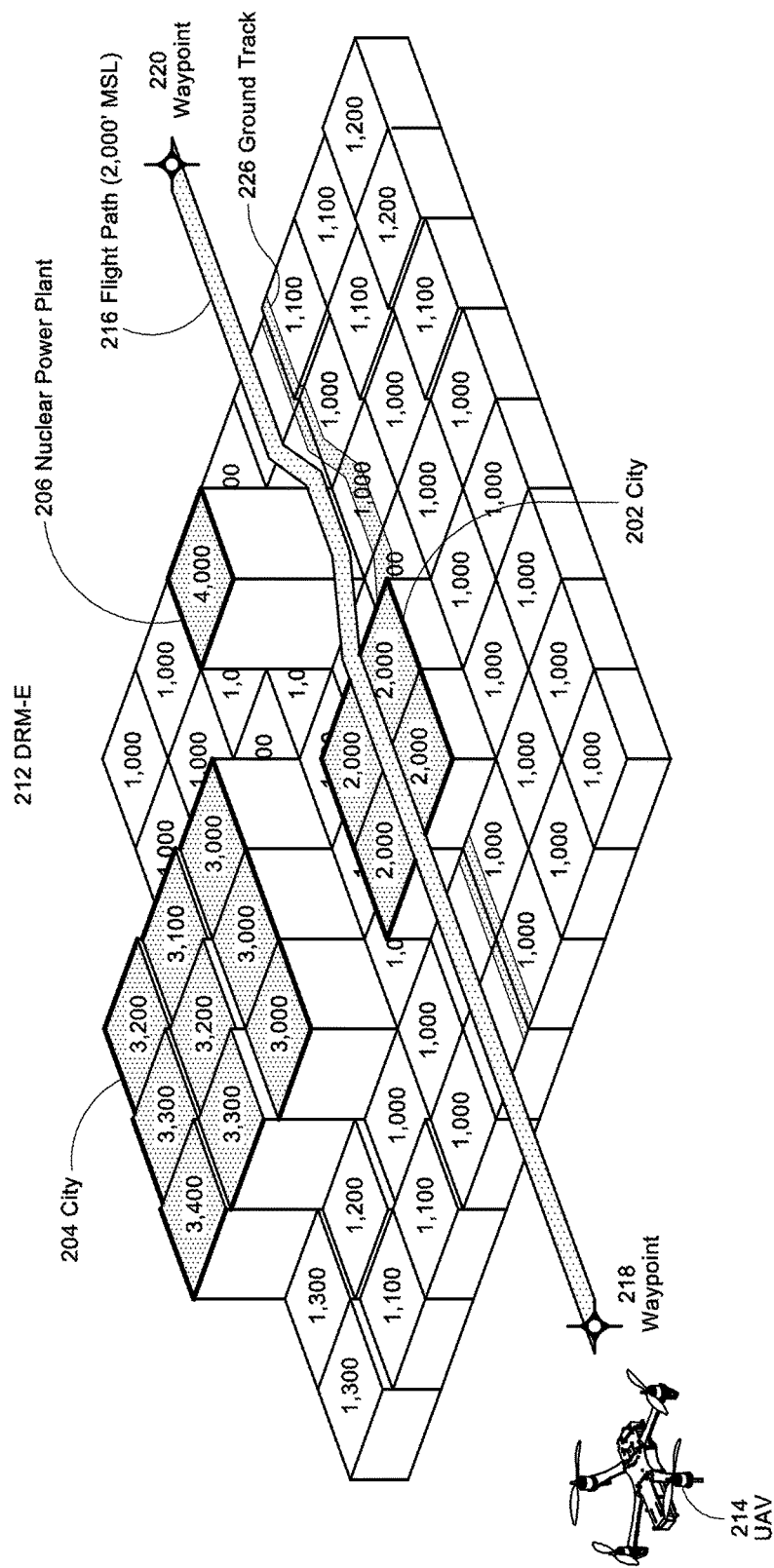
FIG. 4C depicts a UAV and a risk-based flight path over the DRM-E.

Referring now to FIG. 4C, assume a risk-based flight path 224 has been generated by a route generating algorithm, one that circumnavigates the RE cell of the nuclear power plant 206 while maintaining the flight altitude; a ground track 226 corresponding to the flight path is illustrated. In addition, it will be assumed for the purpose of illustration and not of limitation that a situation in which a flight altitude of an aircraft that equals an RE such as illustrated by a portion of the flight path that traverses over city 202 is a minimum acceptable flight altitude for safe flight; as such, a flight path circumnavigating the RE cells of city 22 is not necessary.

Figure 4D:
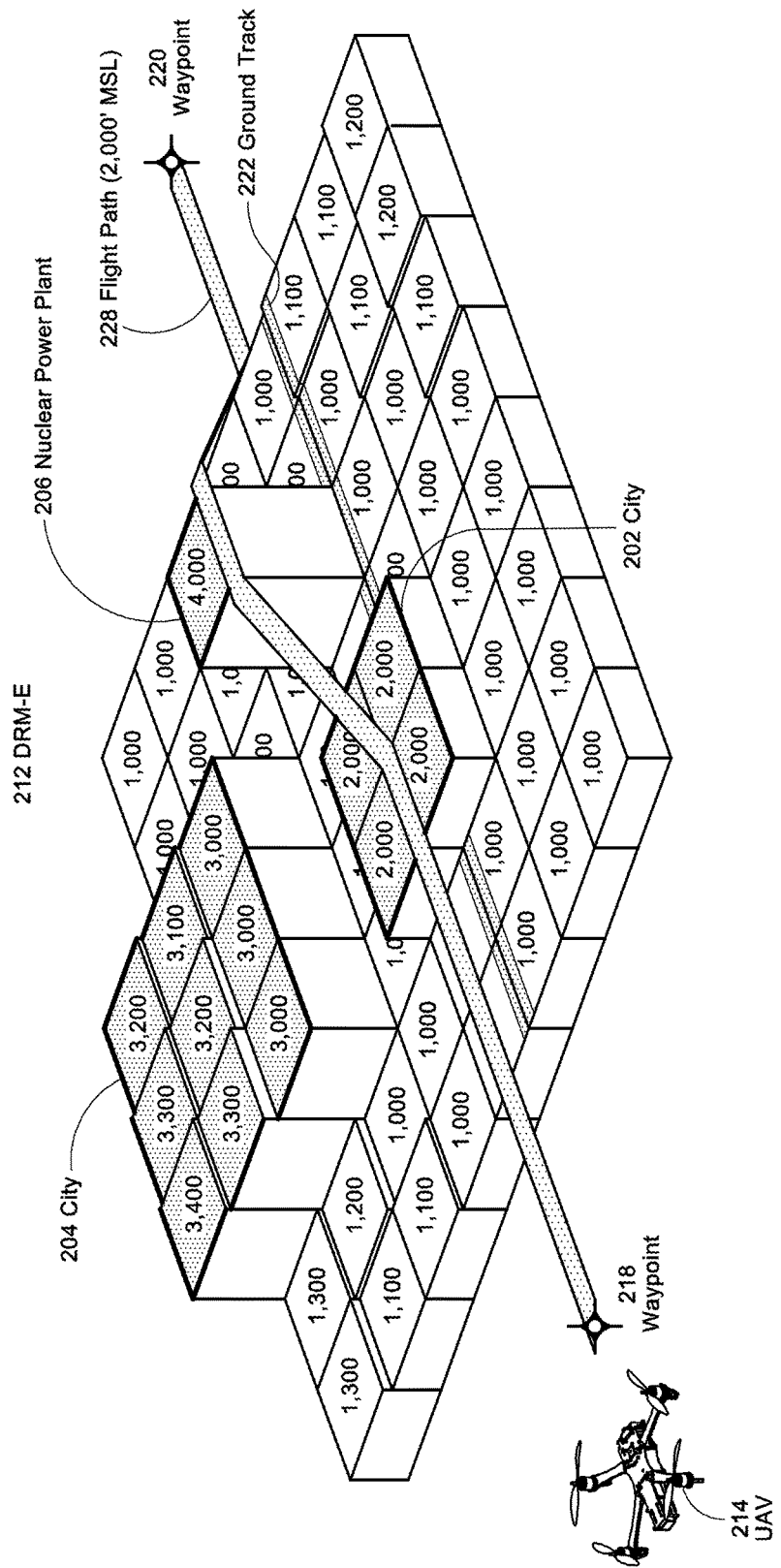
FIG. 4D depicts a UAV and a risk-based flight path over the DRM-E.

Referring now to FIG. 4D, assume a second risk-based flight path 228 has been generated by a route generating algorithm, one that climbs to the RE (an assumed minimum acceptable flight altitude) of the RE cells of the nuclear power plant 206 to traverse the airspace above the RE cell. In this instance, the ground track 222 shown in FIG. 4B corresponds to the flight path 228 of FIG. 4D.

Figure 5A:
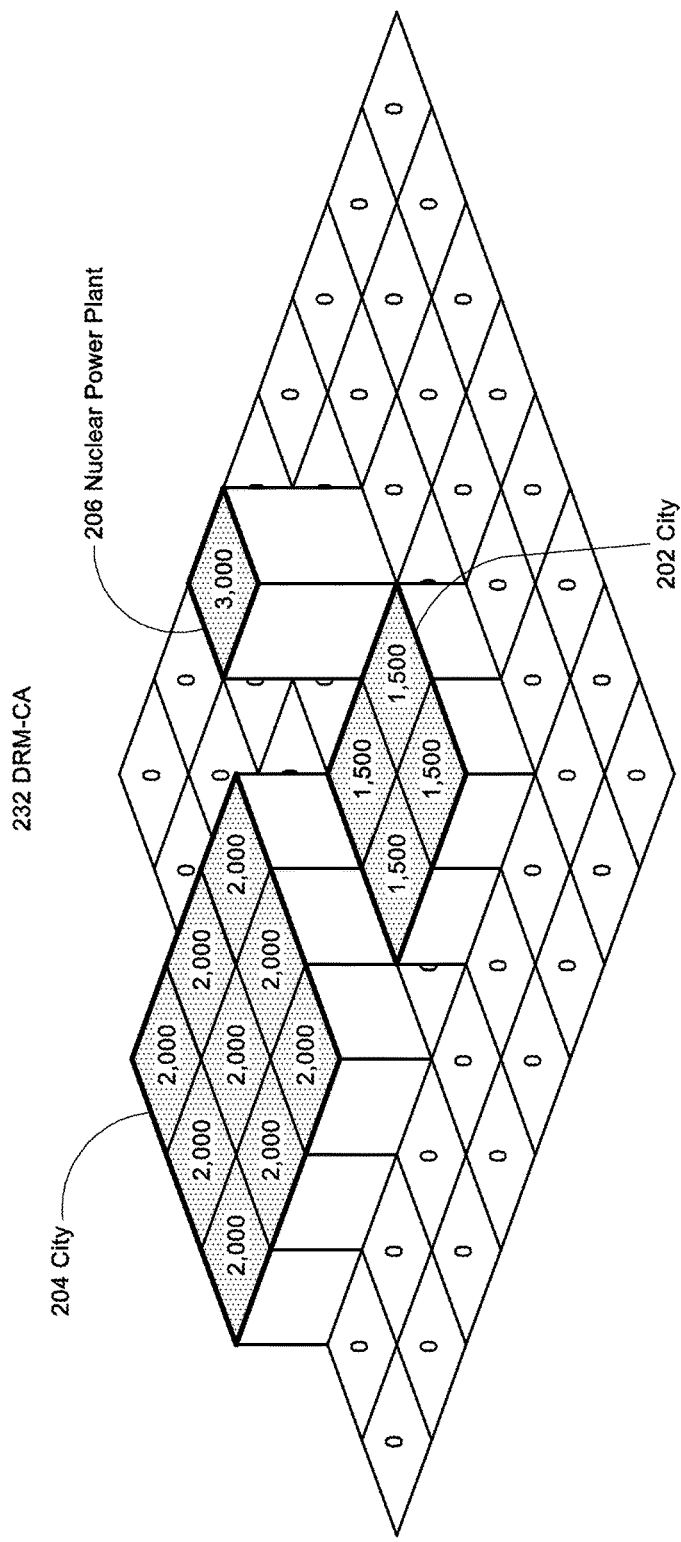
FIG. 5A depicts a second DRM-CA associated with the DRM.

Referring now to FIG. 5A, a second DRM-CA 232 includes a plurality of risk CA cells associated with the plurality of risk level cells of the DRM 208, where the risk CAs for risk levels 1, 2, and 4 remain the same as those shown in FIG. 3B; however, a risk CA of 1,500 feet AGL instead of 1,000 AGL has been assigned to risk level 3 in FIG. 5A.

Figure 5B:
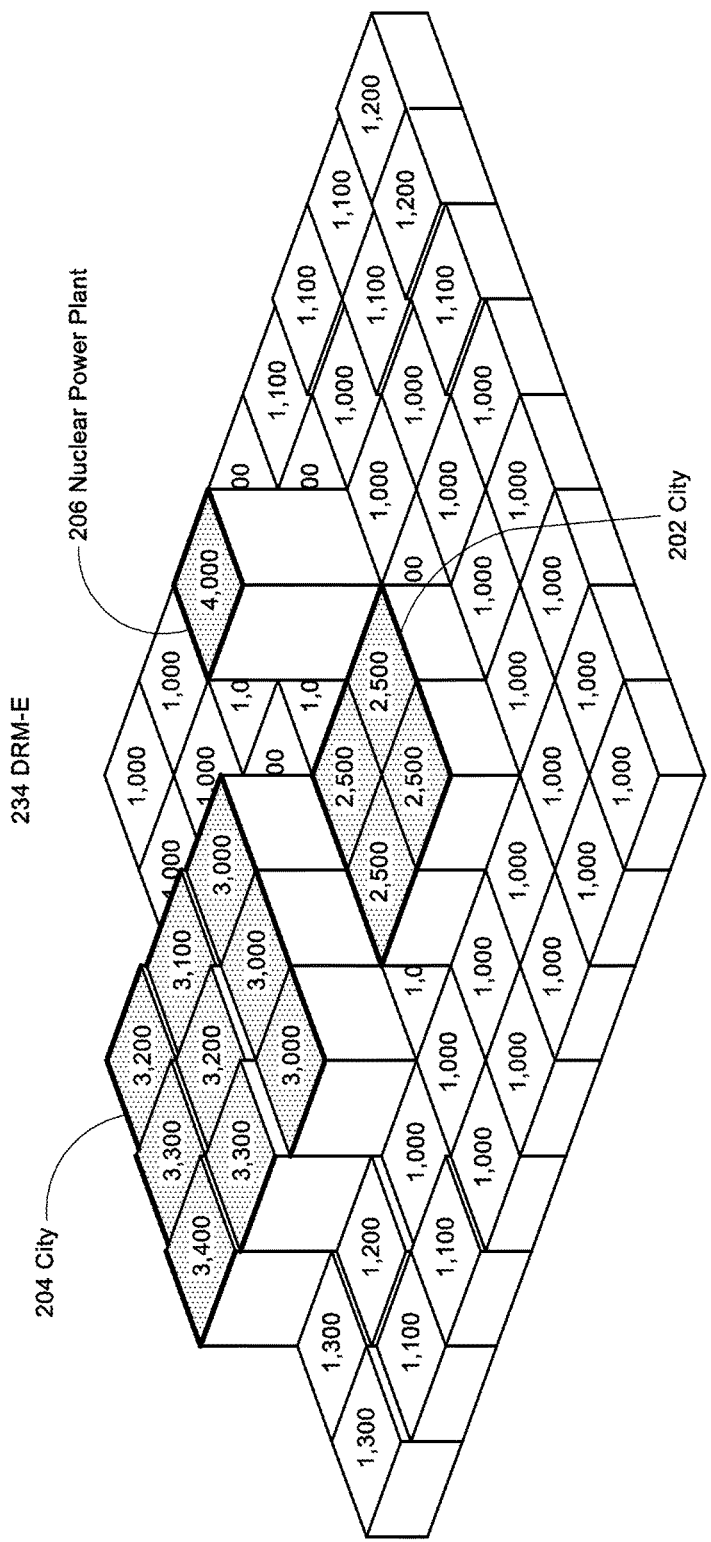
FIG. 5B depicts a second DRM-E associated with the DRM.

Referring now to FIG. 5B, a second DRM-E 234 includes a plurality RE cells associated with the plurality of risk level cells of the DRM 208 and/or the plurality of risk CA cells of the DRM-CA 210. In this instance, the RE for each RE cell of city 202 is 2,500 feet MSL, the sum of its associated terrain cell elevation of 1,000 feet MSL of the DEM 200 and its associated risk CA of 1,500 AGL of the DRM-CA 232.

Figure 6A:
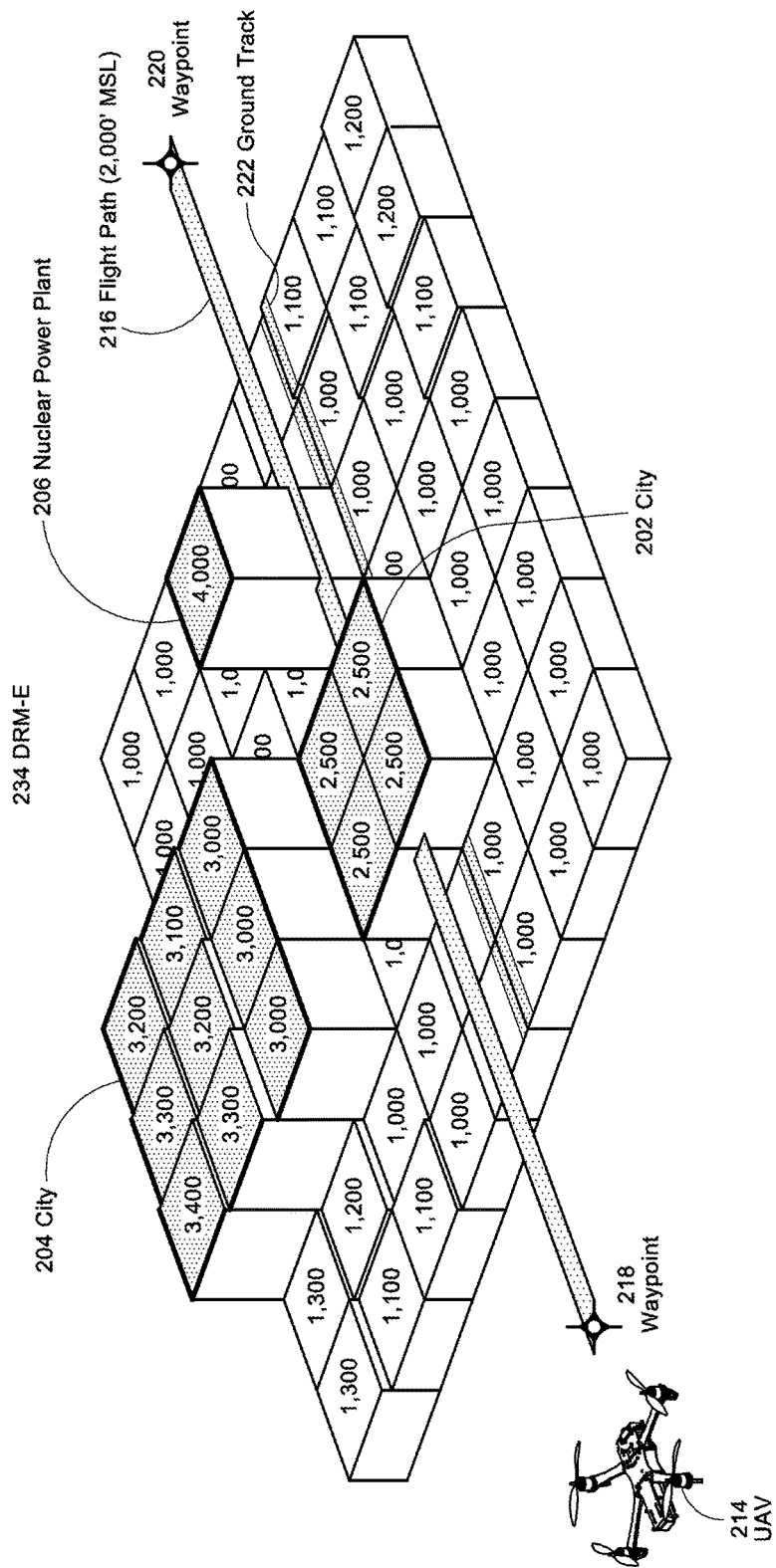
FIG. 6A depicts a UAV and its planned flight path over the second DRM-E.

Referring now to FIG. 6A, the flight path 216 is projected with the RE cells of the DRM-E 234. As observed, the flying altitude of 2,000 feet MSL is less than the RE of each RE cell of city 202 as well as the RE of RE cell of the nuclear power plant 206. Each RE cell of city 202 and the RE cell of the nuclear power plant 206 hinder part of the flight path 216, creating full RE cells that are not traversable.

Figure 6B:
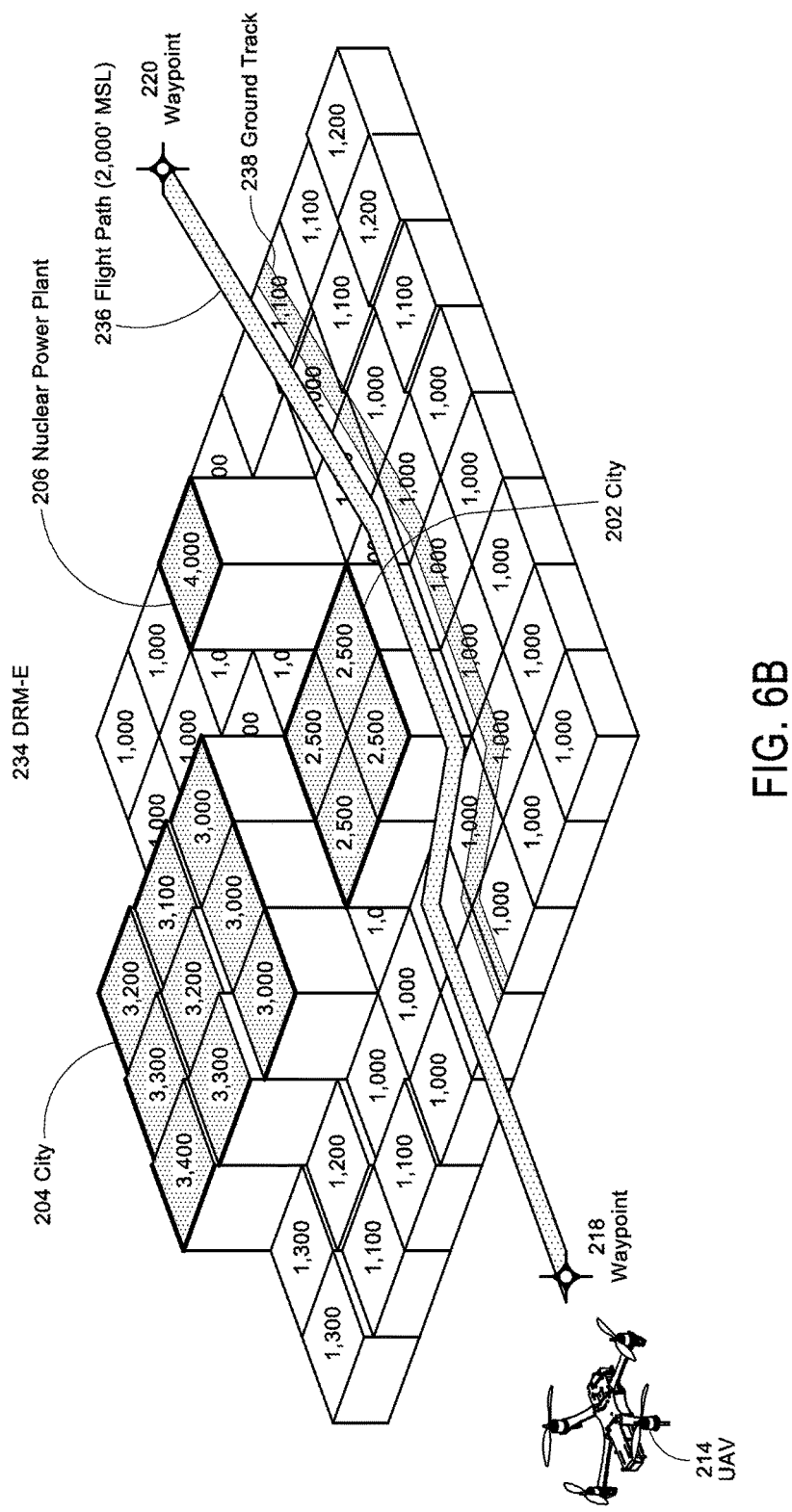
FIG. 6B depicts a UAV and a risk-based flight path over the second DRM-E.

Referring now to FIG. 6B, assume a risk-based flight path 236 has been generated by a route generating algorithm, one that circumnavigates each RE cell of city 202 and the RE cell of the nuclear power plant 206 to the right while maintaining the flight altitude; a ground track 238 corresponding to the flight path is illustrated.

Figure 6C:
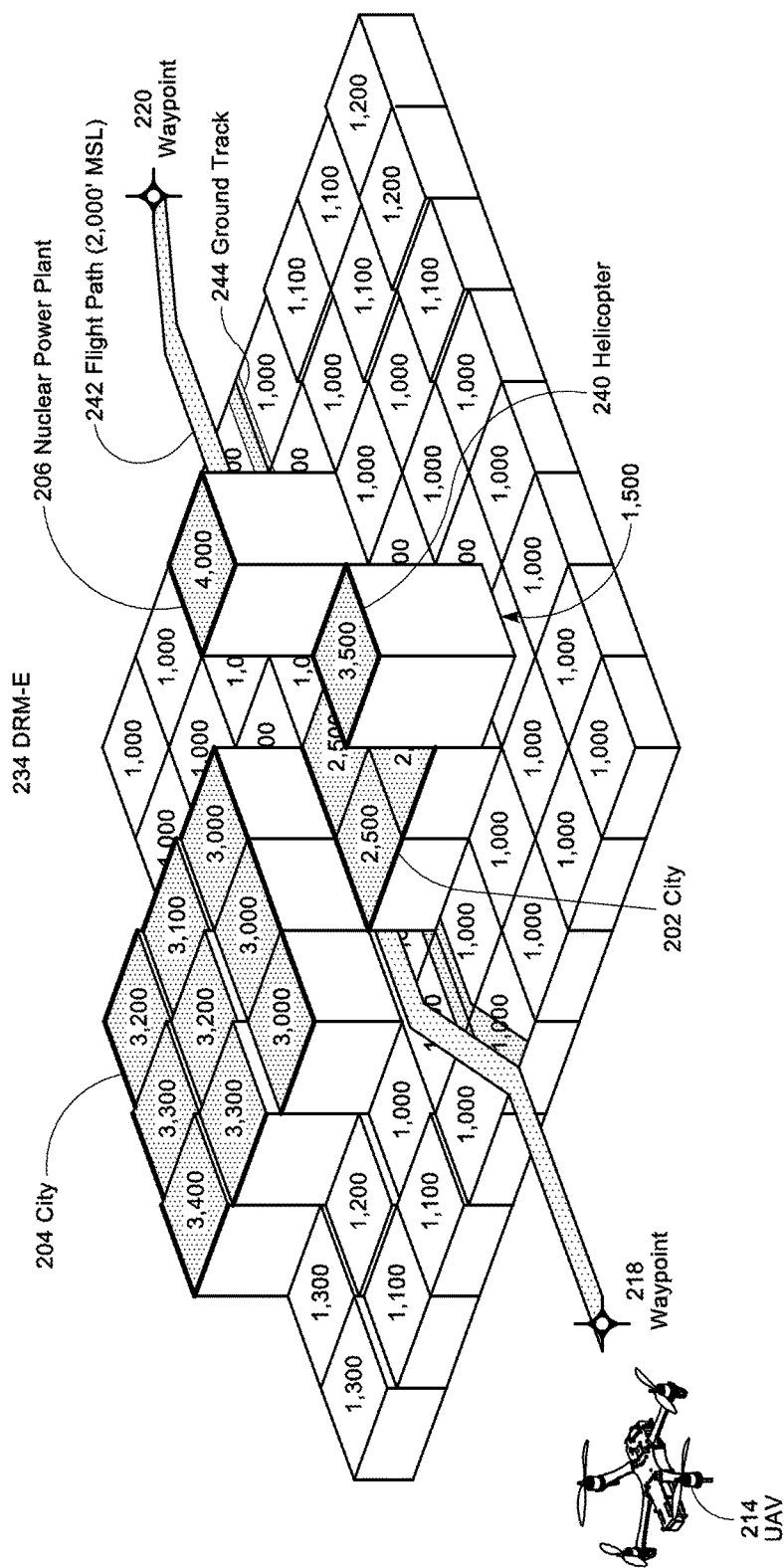
FIG. 6C depicts a UAV and a second risk-based flight path over the second DRM-E.

Referring now to FIG. 6C, assume that a threat comprised of a helicopter enters the flight path 236 of the UAV 214; this threat could be the result of input received from a threat source discussed in the Young reference including threat data received by an aircraft via a datalink system installed in an aircraft and/or by a remote operator via a communication system employed by a remote operator. Assuming the helicopter is flying at an altitude of 2,500 feet MSL and risk CAs of 1,000 feet above and below the helicopter have been assigned, a risk CA cell 240 encompassing the helicopter and located above the terrain cell(s) over which the helicopter is occupying may be created; this is shown by the RE cell 240 having a floor and a ceiling of 1,500 feet MSL of 3,500 feet MS, respectively. Because of the helicopter's intrusion into the flight path 236, an alternative flight path 242 has been generated by a route generating algorithm, one that circumnavigates each RE cell of city 202 and the RE cell of the nuclear power plant 206 to the left while maintaining the flight altitude; a ground track 244 corresponding to the flight path is illustrated.

Instead of climbing above the city 202 and the nuclear power plant 206, the flight path 236 is diverted to the left, thereby avoiding them. In some embodiments, an altitude limitation or restriction could have been placed the UAV 214 based upon a real-time determination of aircraft performance from input received from the performance factors data source 130 of one or more performance factors. Risk CAs and/or REs could be modified and based upon a real-time availability or unavailability of one or more aircraft systems as indicated by one or more performance factors of the performance factors data source 130, where the availability or unavailability could depend upon the serviceability or unserviceability of one or more aircraft systems; a real-time availability of one or more aircraft systems could increase risk CAs and/or REs or real-time unavailability could decrease a risk CAs and/or REs.

Similarly, the altitude limitation or restriction could be associated with risk levels that are assigned or based upon a real-time availability or unavailability of one or more aircraft systems as indicated by one or more performance factors of the performance factors data source 130, where the availability or unavailability could depend upon the serviceability or unserviceability of one or more aircraft systems; a real-time availability of one or more aircraft systems could lower a risk level (or keep an existing risk level low) or an unavailability could increase the risk level, possibly adjusting a risk CA and/or RE. In this example of FIG. 6C, it is assumed that an altitude limitation or restriction has been placed on the UAV 214, making it not possible for the route generating algorithm to generate a flight path that traverses above the RE cells of city 202 and the nuclear power plant 206.

As discussed above, there are a plurality of resolutions from which to form the DEM 200. As shown in FIGS. 7A through 8D, the single cell of nuclear power plant 206 found in the DRM-CA 210 and the DRM-E 212 is now comprised of a plurality of cells. In the discussion that follows, these will be used to illustrate how risk CAs and REs for a cluster of cells encompassing risk objects could differ among risk levels.

Figure 7A:
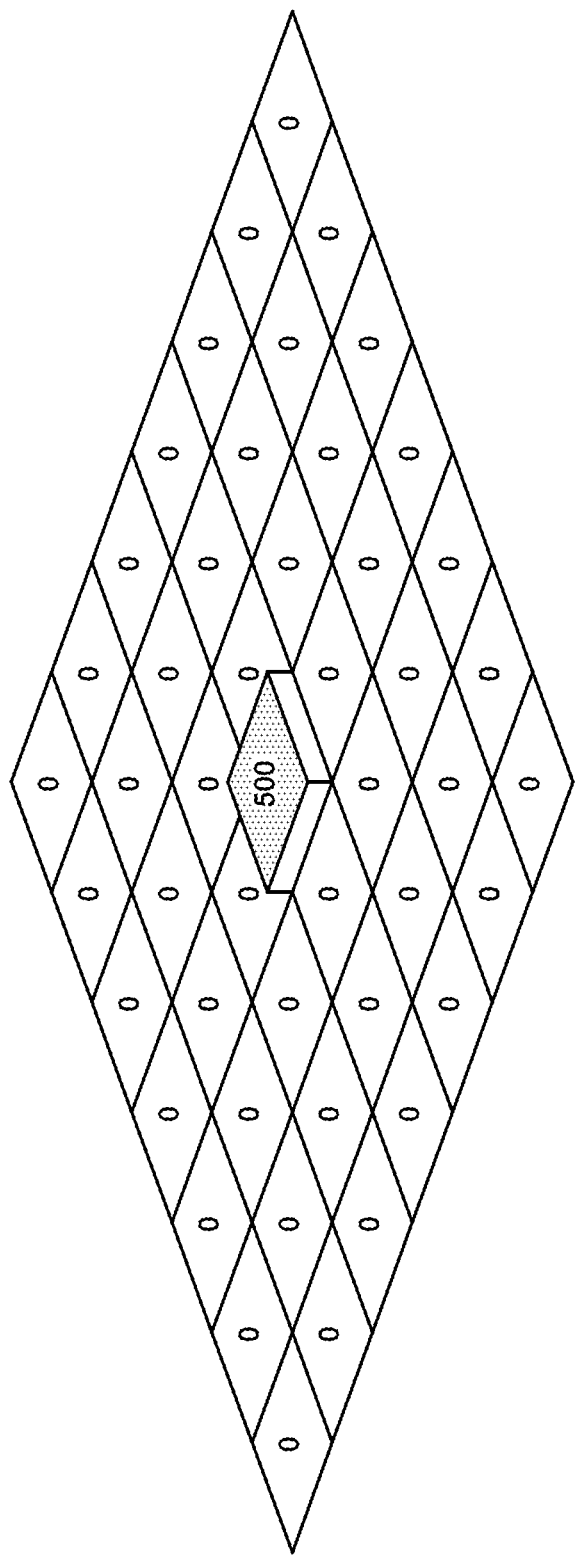
FIG. 7A depicts a DRM-CA (Risk Level 1) of a nuclear power plant.

Referring now to FIG. 7A, a DRM-CA for a risk level 1 is shown, where risk level 1 is associated with the largest amount of risk that an operator may be willing to accept. Lower numerical risk levels could be associated with smaller cells and/or lower CAs. As illustrated, the DRM-CR for risk level 1 includes a single risk CA cell at the center (assumed to encompass a nuclear reactor). As shown, a hypothetical risk CA of 500 feet AGL has been assigned to the center cell, a risk CA that is less than the larger-sized cell of the nuclear power plant 206 having a risk CA of 3,000 feet AGL.

Figure 7B:
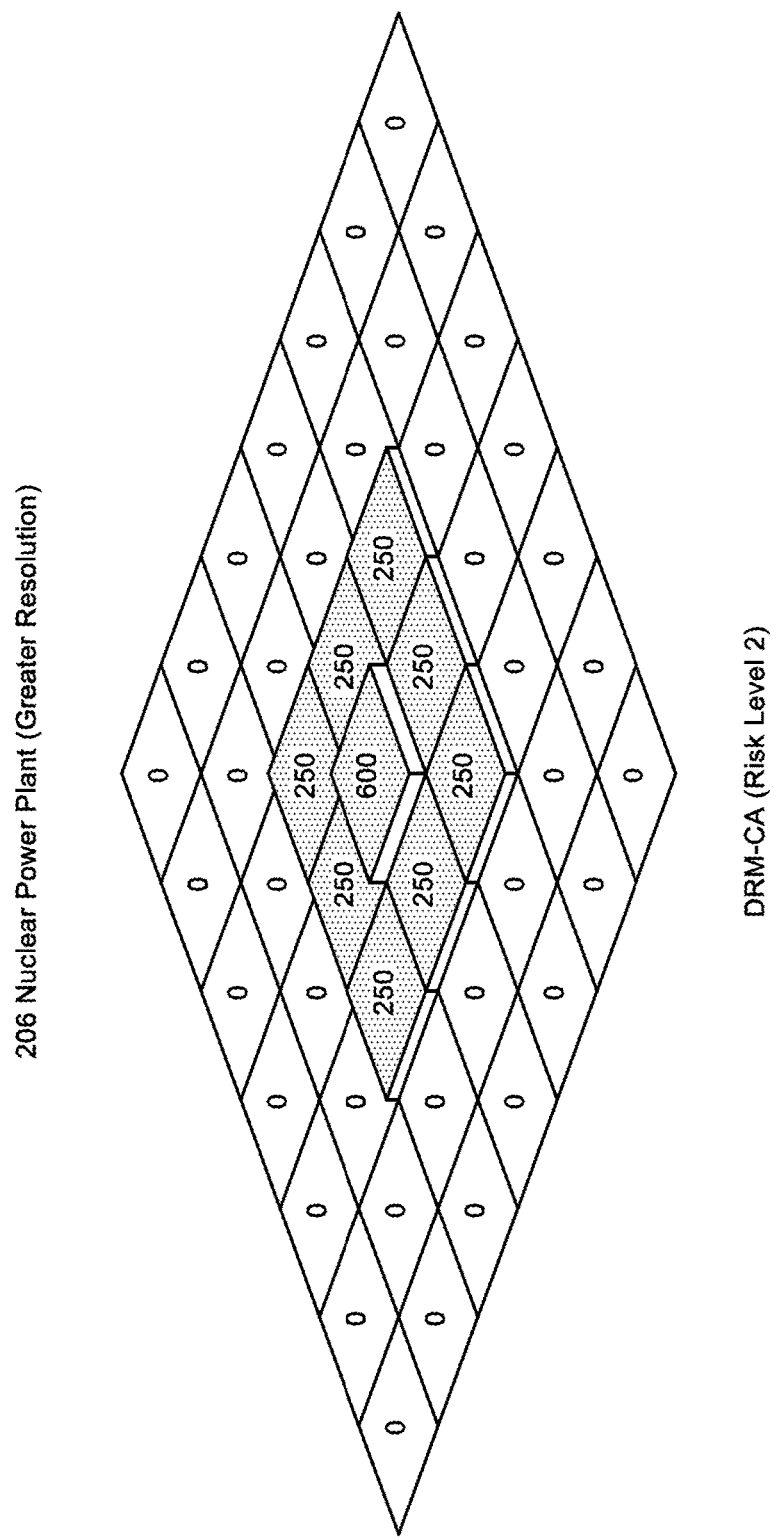
FIG. 7B depicts a DRM-CA (Risk Level 2) of the nuclear power plant.

Referring now to FIG. 7B, a DRM-CA for a risk level 2 is shown, where risk level 2 is associated with a lesser amount of risk. As illustrated in FIG. 7B, the DRM-CR for risk level 2 includes a cluster of eight risk CA cells encompassing the center risk CA cell. As shown, hypothetical risk CAs of 250 feet AGL have been assigned to the eight risk CA cells and 600 feet AGL to the center risk CA cell.

Referring now to FIG. 7C, a DRM-CA for a risk level 3 is shown, where risk level 3 is associated with even a lesser amount of risk. As illustrated in FIG. 7C, the DRM-CR for risk level 3 includes a cluster of sixteen risk CA cells and eight risk CA cells encompassing the center risk CA cell. As shown, hypothetical risk CAs of 300 feet AGL have been assigned to the sixteen risk CA cells, 700 feet AGL to the eight risk CA cells, and 1,000 feet AGL to the center risk CA cell.

Figure 7D:
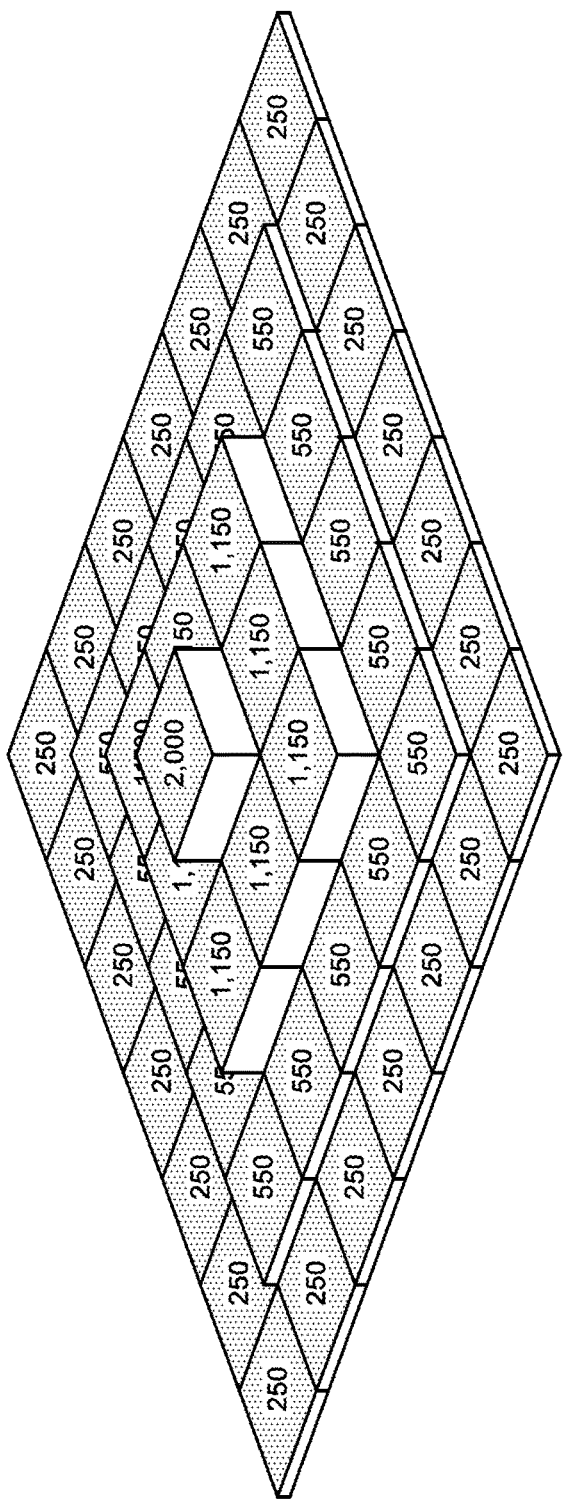
FIG. 7D depicts a DRM-CA (Risk Level 4) of the nuclear power plant.
Figure 8B:
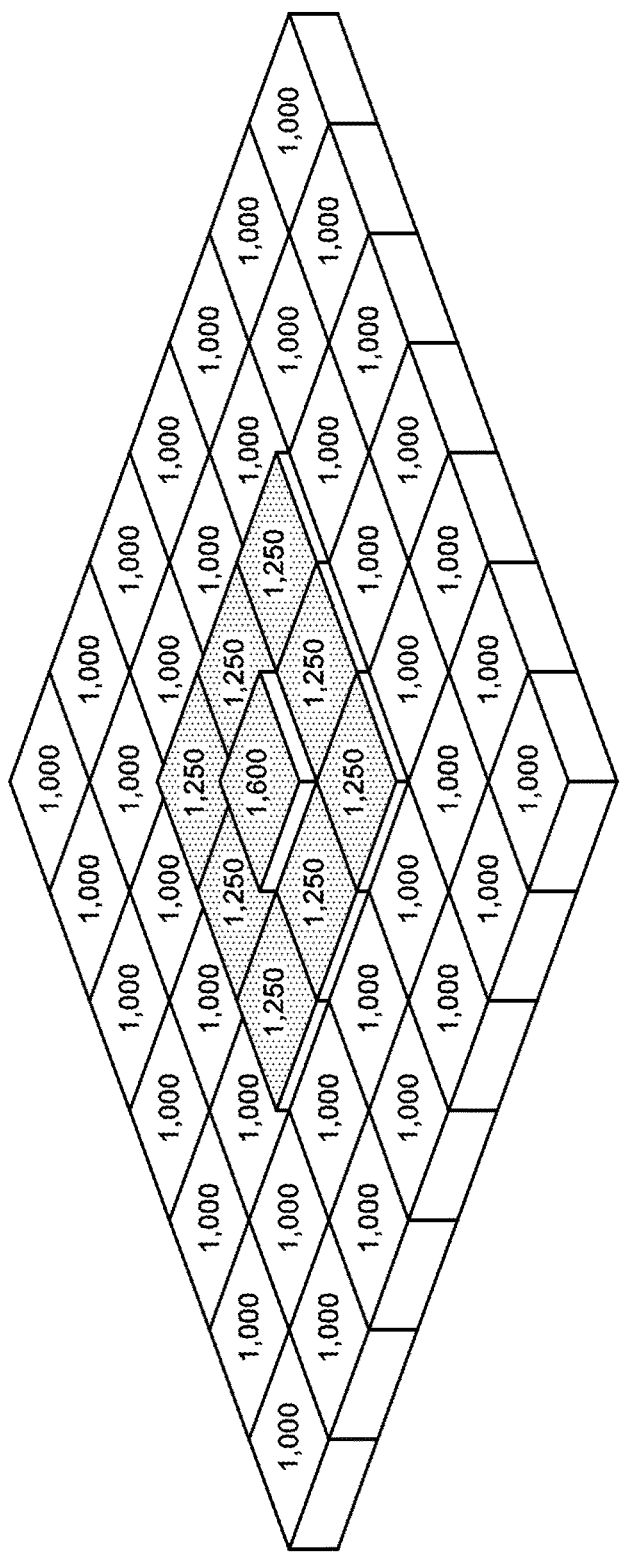
FIG. 8B depicts a DRM-E (Risk Level 2) of the nuclear power plant.
Figure 8C:
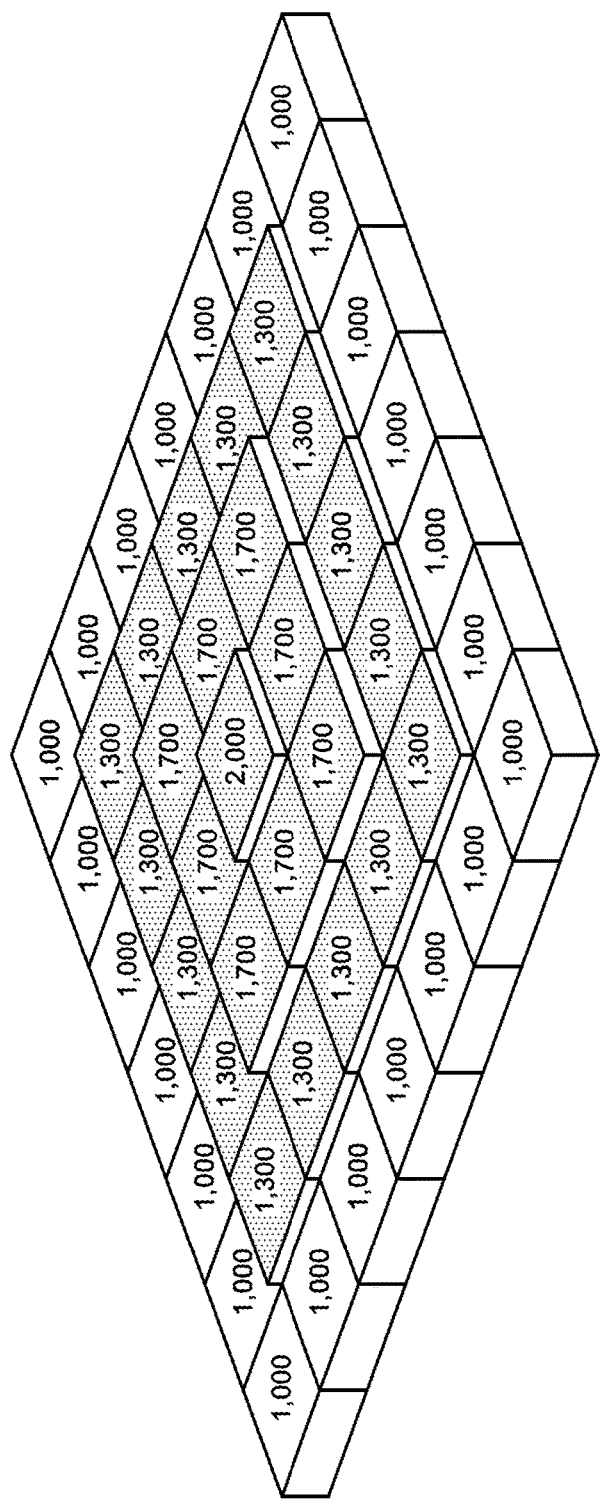
FIG. 8C depicts a DRM-E (Risk Level 3) of the nuclear power plant.
Figure 8D:
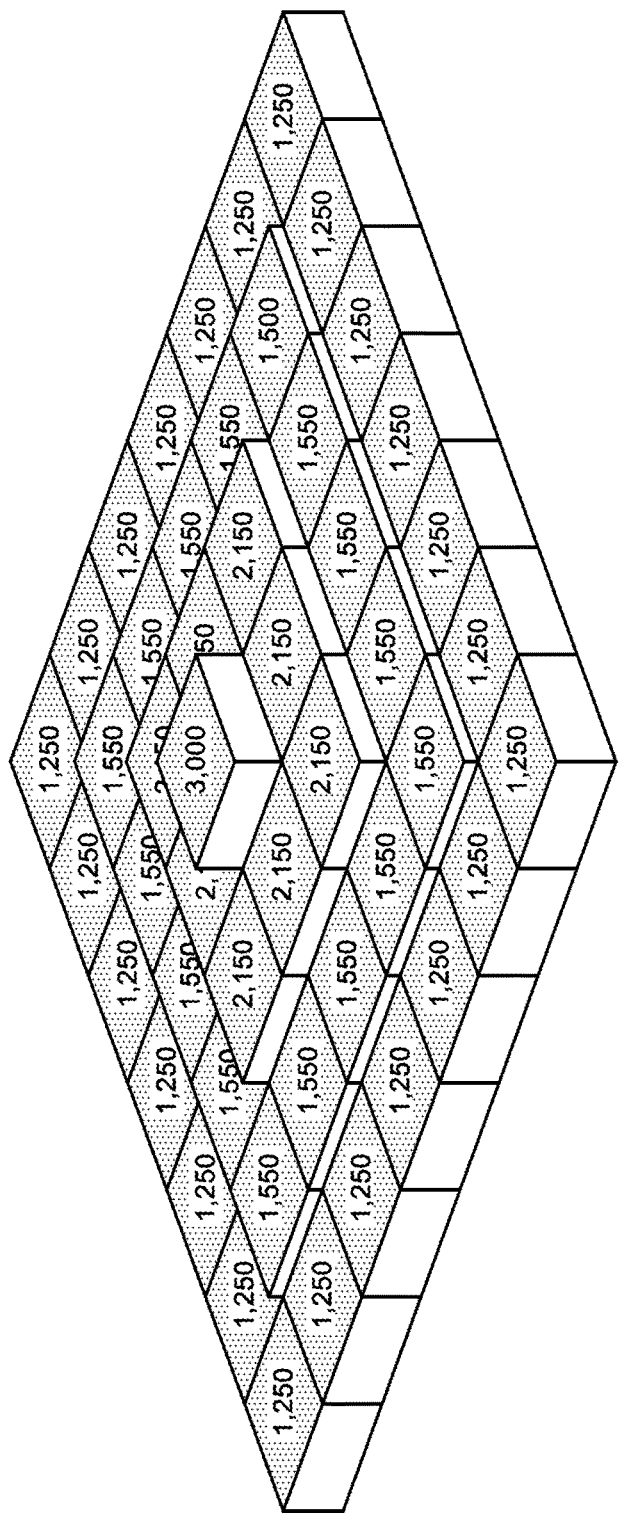
FIG. 8D depicts a DRM-E (Risk Level 4) of the nuclear power plant.

Referring now to FIG. 7D, a DRM-CA for a risk level 4 is shown, where risk level 4 is associated with the lowest amount of risk that an operator may be willing to accept in these illustrations. As illustrated in FIG. 7D, the DRM-CR for risk level 4 includes a cluster of twenty-four risk CA cells, sixteen risk CA cells, and eight risk CA cells encompassing the center risk CA cell. As shown, hypothetical risk CAs of 250 feet AGL have been assigned to the twenty-four risk CA cells, 550 feet AGL to the sixteen risk CA cells, 1,150 feet AGL to the eight risk CA cells, and 2,000 feet AGL to the center risk CA cell.

Referring now to FIGS. 8A through 8D, DRM-Es for risks level 1 through 4 are shown, respectively. The DRM-Es of FIGS. 8A through 8D correspond to the DRM-CRs of FIGS. 8A through 8D, respectively.

Figure 9A:
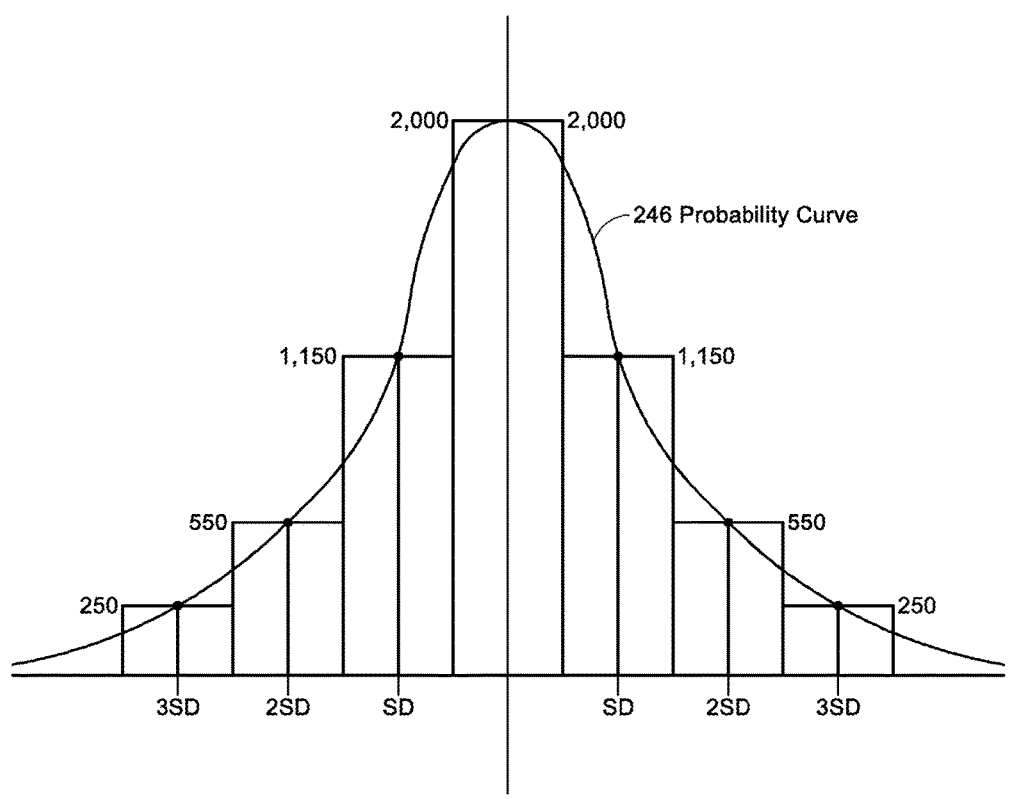
FIG. 9A depicts a probability curve corresponding to the DRM-CA (Risk Level 4) of FIG. 7D.

As embodied in the inventive concepts disclosed herein, risk CAs for a cluster of risk CA cells could be determined as a probability distribution function as reflected by a probability curve that may developed or created by those concerned with a risk and costs associated with UAV. Referring now to FIG. 9A, a probability curve 246 has been developed. For the purpose of illustration, the probability curve 246 may be a normal probability curve of a normal distribution function. As observed, the center risk CA cell is a point of maximum amplitude on the curve and has been assigned a risk CA of 2,000 feet AGL. From here, a first standard deviation (SD) may be used to determine a risk CA of a first, innermost layer encompassing the center risk CA cell; with rounding of numbers, this corresponds to a risk CA of 1,150 feet AGL. Then, a second SD may be used to determine a risk CA of each risk CA cell of a second layer encompassing the first, innermost layer; this corresponds to a risk CA of 550 feet AGL. Then, a third SD may be used to determine a risk CA of each risk CA cell of a third layer encompassing the second layer; this corresponds to a risk CA of 250 feet AGL.

It should be noted that, although the discussion herein is drawn to one cell width having the same size of one SD, the embodiments of the inventive concepts disclosed herein are not limited to this equality. Instead, each cell width of FIG. 9A could be represented of a combined width resulting from a plurality of contiguous cells having greater or higher resolutions than those provided herein for the purpose of illustration only.

Figure 9B:
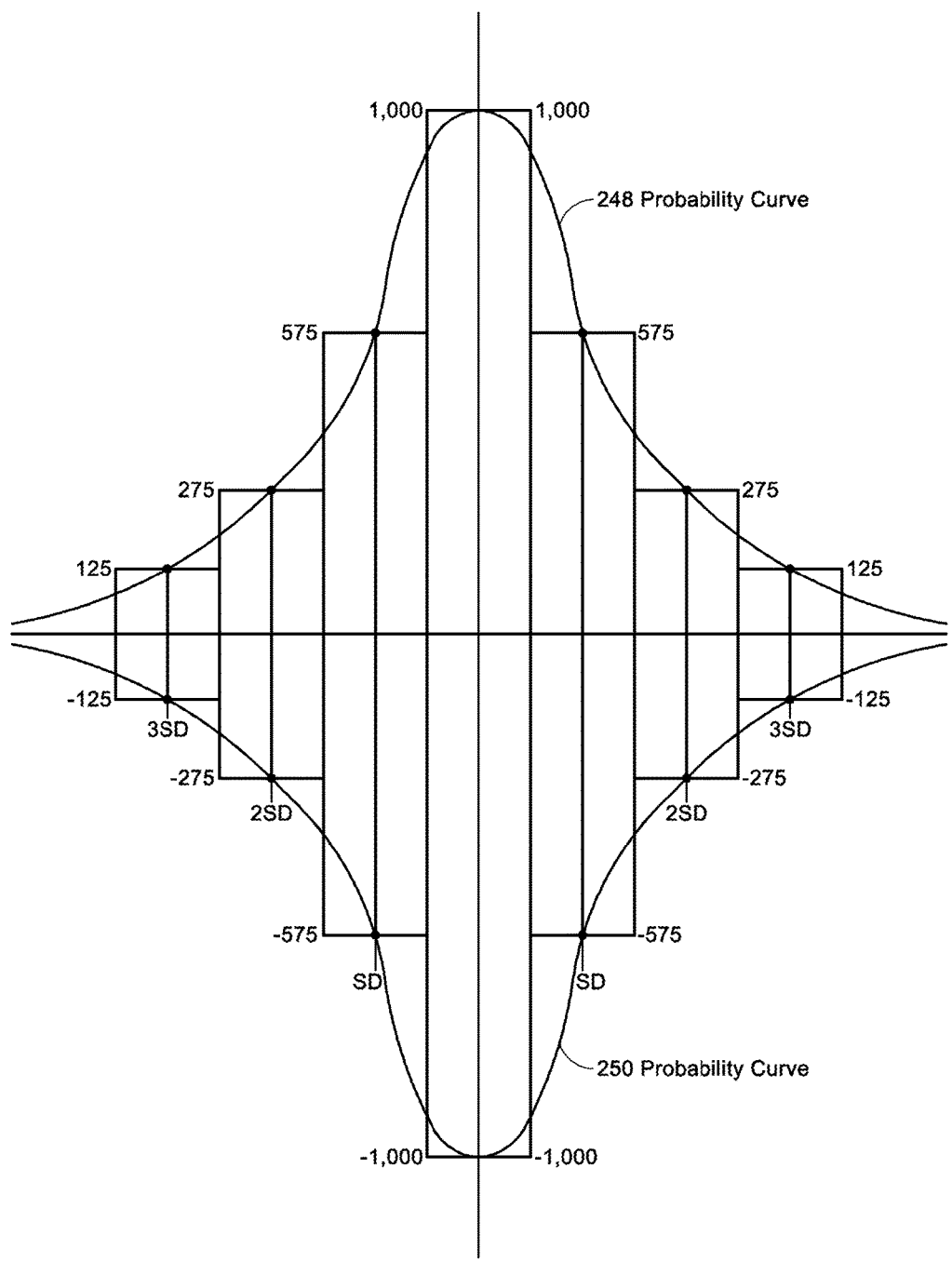
FIG. 9B depicts probability curves of the helicopter of FIG. 6C.

Referring now to FIG. 9B, probability curves 248 and 250 have been developed for the purpose of determining risk spacing or risk clearance distances (singularly, CD) from non-stationary objects or threats such as helicopters; similar to FIG. 9A, the probability curves 248 and 250 are normal probability curves. As observed, center risk CD cells are points of maximum amplitude of the curves and have been assigned risk CDs of 1,000 feet AGL. From here, a first standard deviation (SD) may be used to determine risk CDs of first, innermost layers encompassing the center risk CD cells; this corresponds to risk CDs of 575 feet AGL (rounded). Then, a second SD may be used to determine risk CDs of each risk CD cell of a second layer encompassing the first, innermost layer; this corresponds to a risk CD of 275 feet AGL. Then, a third SD may be used to determine risk CDs of each risk CD cell of a third layer encompassing the second layer; this corresponds to risk CDs of 125 feet AGL.

Figure 9C:
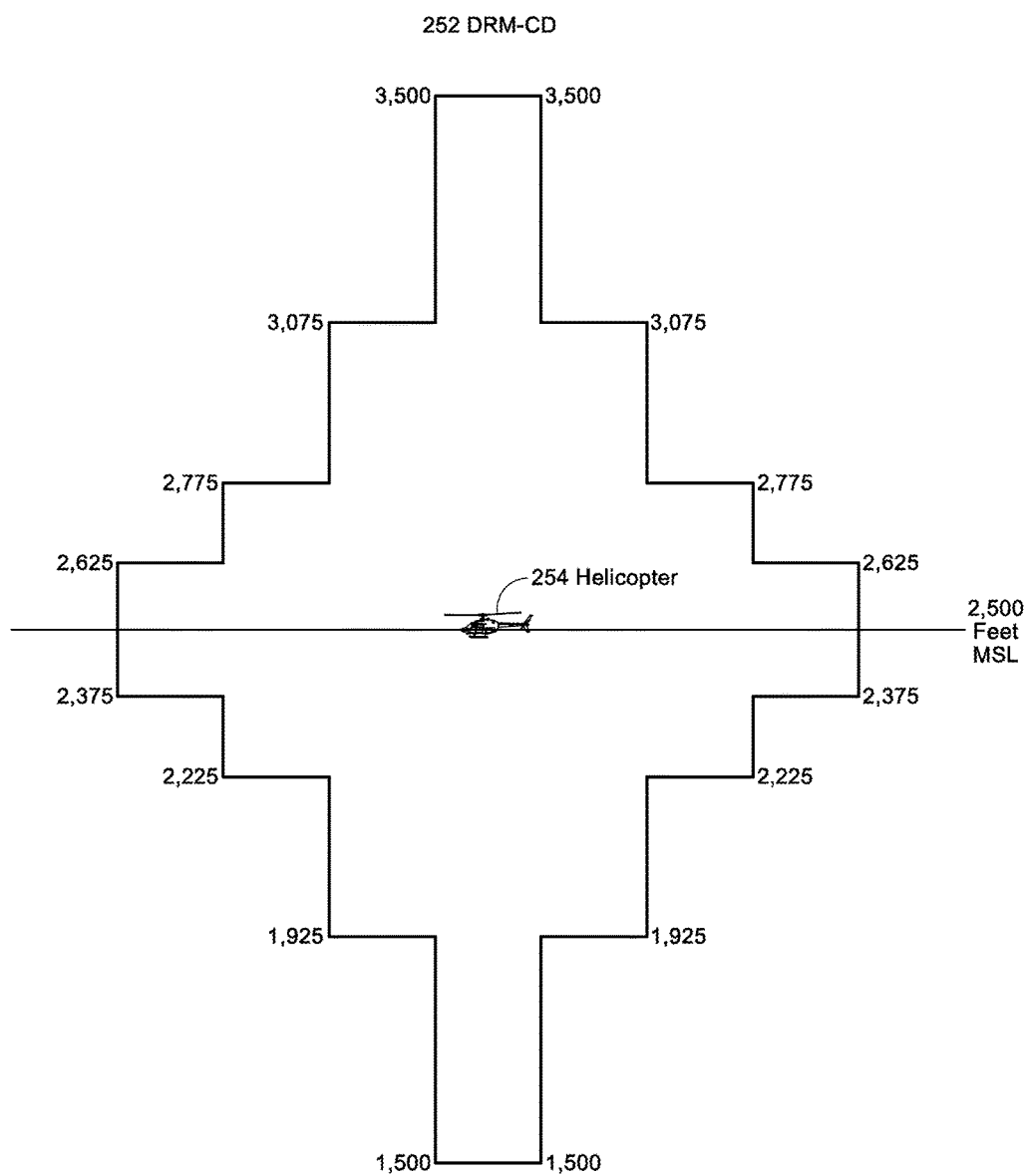
FIG. 9C depicts a DRM-E of the helicopter of FIG. 6C.

Given the risk CDs developed from the probability curves 248 and 250, a dynamic DRM-E may be developed from the CDs. Referring now to FIG. 9C, DRM-E 252 in the direction of flight of a helicopter 254 is shown, where the values are measurements made with respect to MSL. It should be noted that, for the purposed of illustration, the helicopter 254 is assumed to be hovering. Where movement of non-stationary objects or threats exists, those concerned with a risk and costs associated with UAV could develop and apply non-normal probability curves that provide for greater CDs in the direction of movement of non-stationary objects or threats (because of greater risk associated with the movement) and lesser CDs in the opposite direction because of lesser risks (because of greater risk associated with the movement). Moreover, a function for determining the probability curve could include one or more variables associated with one or more aircraft performance factors provided by the performance factors data source 130, providing the ability to change the shape of the probability curve and risk CDs in real-time.

Figure 10:
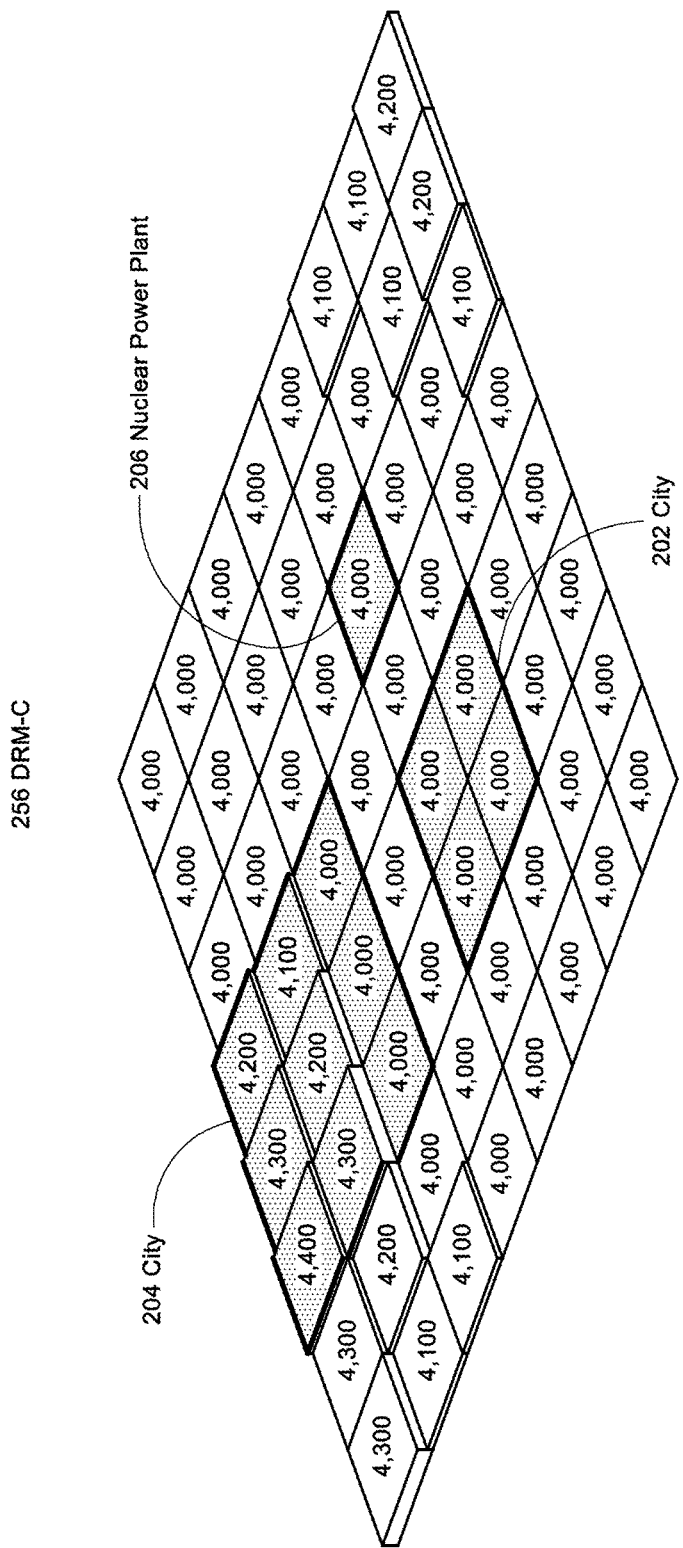
FIG. 10 depicts a plurality of risk ceiling cells of a digital risk model (DRM-C) associated with the DRM.

Referring now to FIG. 10, an altitude limitation or restriction could be set into place by one or more of those concerned with risks and costs associated with operations of a UAV using a digital risk model of ceilings (DRM-C) 256 comprised of a plurality of risk ceiling cells. Similar to a DRM-CA and a DRM-E, the DRM-C 256 could be developed to impose risk ceilings to impose a limitation or restriction of a maximum flying altitude. Risk ceilings could be employed where an aviation-governing authority has defined or established an airspace area above the risk ceiling.

The plurality of risk ceiling cells of the DRM-C 256 could be associated with the plurality of risk level cells of the DRM 208, where the risk ceilings for risk levels 1-4 have been assigned as being 3,000 feet AGL; that is, terrain cells having elevations of 1,000 feet MSL through 1,400 feet MSL as shown in FIG. 2 have been assigned risk ceilings of 4,000 feet MSL through 4,400 feet MSL, respectively, as shown in FIG. 10. When the DRM-C 256 is employed, a route generating algorithm could include risk ceilings to ensure that the flying altitude of a potential route does not go above (or penetrate from below) one or more risk ceilings.

Similar to clearance altitudes and/or risk elevations, risk ceilings could be modifiable and based upon a real-time availability or unavailability of one or more aircraft systems as indicated by one or more performance factors of the performance factors data source 130. The availability or unavailability of one or more aircraft systems could depend upon the serviceability or unserviceability of one or more aircraft systems; a real-time availability of one or more aircraft systems could increase risk ceilings or a real-time unavailability could decrease a risk ceilings.

Figure 11:
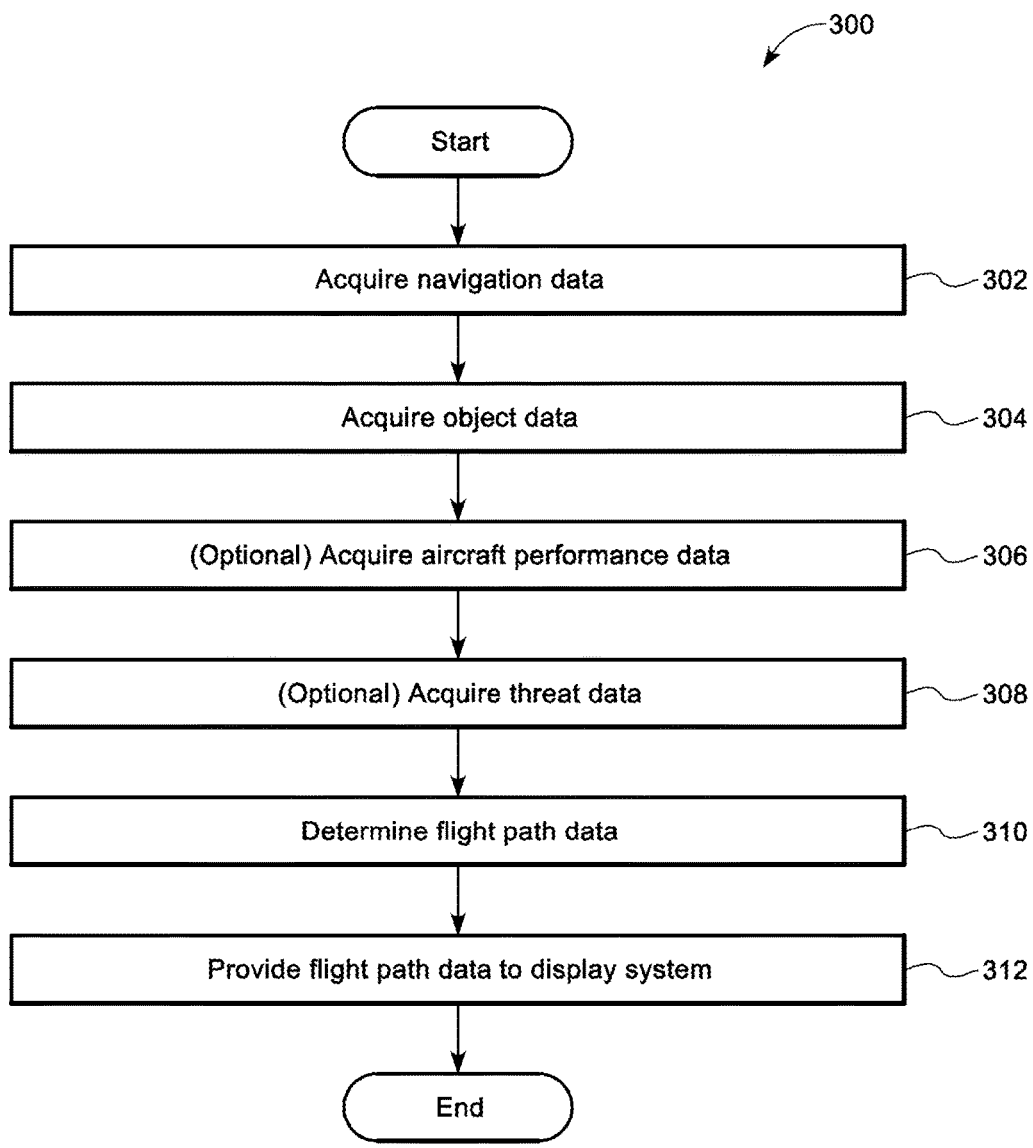
FIG. 11 depicts a flowchart illustrating an exemplary embodiment of a method for generating a risk-based flight path.

FIG. 11 depicts flowchart 300 disclosing an example of a method for generating a risk-based flight path employed within a UAV or by UAV operating in conjunction with an operator in a stationary or mobile control station, where the RG 140 may be programmed or configured with instructions corresponding to the modules embodied in flowchart 300. In some embodiments, the RG 140 may be a processor or a combination of processors found in the display system 150 or any other system suitable for performing the task. Also, the RG 140 may be a processor of a module such as, but not limited to, a printed circuit card having one or more input interfaces to facilitate the two-way data communications of the RG 140, i.e., the receiving and providing of data. As necessary for the accomplishment of the following modules embodied in flowchart 300, the acquiring of data is synonymous and/or interchangeable with the receiving and/or retrieving of data, and the providing of data is synonymous and/or interchangeable with the making available or supplying of data.

The method of flowchart 300 begins with module 302 with the RG 140 acquiring navigation data, where the navigation data could be representative of at least a flight plan. The flight plan could include one or more flight legs; each flight leg could be defined by beginning waypoint and an ending waypoint, where the beginning waypoint could be the current location of the aircraft. In some embodiments, the waypoint(s) could be a defined waypoint defined by an owner and/or operator of the UAV. In other embodiments, the navigation data could include the date and/or time of day.

The flowchart continues with module 304 with the RG 140 acquiring risk object data from at least one object data source 120 based upon the navigation data. In some embodiments, the object data source 120 could include DEM data and DRM data.

In other embodiments, the object data source 120 could include risk object data comprised of DRM data representative of one or a plurality of risk CAs and/or REs per cell, where the each cell of the plurality could correspond to one risk level, date, and/or time of day. Date and/or time of day may be used to acquire risk CAs and/or REs associated with time-variant conditions such as, for example, surface roads and rush hour traffic as well as stadiums and schedules events, where higher CA and/or REs may be employed temporally in the vicinity of surface roads and stadiums and stored in the object data source 120, and acquired during days and times of rush hours.

In other embodiments, the object data source 120 could include risk object data comprised of DEM data and DRM data representative of risk CAs measured with respect to AGL. In other embodiments, the object data source 120 could include risk object data comprised of DRM data representative of REs measured with respect to MSL. In some embodiments, the DRM data could be derived as a function of a probability curve as discussed above.

The flowchart continues with optional module 306 with the RG 140 acquiring of aircraft performance data from the performance factors data source 130. In some embodiments, altitude limitations or restrictions may be based upon the aircraft performance data. At least a portion of clearance altitudes and/or risk elevations could be modifiable, where modifications may be based upon aircraft performance data acquired from the performance factors data source 130. In other embodiments, risk levels may be based upon the aircraft performance data.

The flowchart continues with optional module 308 with the RG 140 acquiring of threat data from a threat source. The flowchart continues with module 310 with the RG 140 determining and/or generating flight path data representative of a risk-based flight path as a function of the acquired navigation data, the acquired risk object data, and a route generating algorithm. In some embodiments, this function could include the acquired aircraft performance data. In other embodiments, this function for determining flight path data could include the acquired threat data from which clearance distances may be determined as a function of one or more probability curves as discussed above.

The flowchart continues with module 312 with the RG 140 providing the flight path data to at least one of an avionics system installed in a manned or unmanned aircraft and a system of a remote aircraft operator. Avionics systems could include the display system 150, and operator systems could include a display used by a remote operator. In some embodiments, the display system 150 may be configured to present an image of the risk-based flight path, where an image generator could be employed by the display system 150 to generate image data representative of the image risk-based flight path that is represented by the flight path data. In other embodiments, the image of the risk-based flight path may be configured for an egocentric presentation, an exocentric presentation, or a plan view presentation. Then, the method of flowchart 300 ends.

It should be noted that the steps of method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Furthermore, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A system for generating risk-based flight path data, comprising:
 at least one of an avionics system and a remote aircraft operator system configured to:
  receive risk-based flight path data provided by
   a path generator including at least one processor coupled to a non-transitory processor-readable medium storing processor-executable code and configured to:
    acquire navigation data representative of a plurality of waypoints;
    acquire risk-based, elevation data based upon the navigation data and comprised of
     first data representative of a plurality of risk elevations of a plurality of elevation cells of a digital risk model of elevations, or
     second data determinative of a plurality of risk elevations of a plurality of elevation cells of a digital risk model of elevations, where
     a value for each of the risk elevations of the first data or the second data is based upon a plurality of surface elevations of a plurality of surface elevation cells of a digital elevation model adjusted for a level of risk of a crash of an aircraft and a cost corresponding to harm or injury to at least one person, at least one object on the ground, or both arising from the crash;
    determine a risk-based flight path for the aircraft based upon the acquired navigation data, the acquired risk-based, elevation data, and a route generating algorithm;
    generate flight path data representative of the risk-based flight path; and
    provide the flight path data to at least one of an avionics system and a remote aircraft operator system, wherein
     a first avionics system comprised of at least one system of an autoflight system of the aircraft is configured to receive and employ the flight path data,
     a second avionics system comprised of a display system of the aircraft is configured to receive the flight path data and present risk-based flight path information to a viewer located inside the aircraft, or
     the remote aircraft operator system is configured to receive the flight path data and present risk-based flight path information to a viewer located outside the aircraft.

2. The system of claim 1, wherein
 the second data is comprised of
  the plurality of surface elevations of the plurality of surface elevation cells of the digital elevation model, and
  a plurality of risk clearance altitudes of a plurality of risk clearance altitude cells of a digital risk model of clearance altitudes.

3. The system of claim 2, wherein at least a portion of the plurality of risk clearance altitudes is based upon a probability curve of a probability distribution function applied to the portion of the plurality of risk clearance altitudes.

4. The system of claim 2, wherein at least a portion of the plurality of risk elevations is based upon a probability curve of a probability distribution function applied to the portion of the plurality of risk elevations.

5. The system of claim 1, wherein the risk-based, elevation data is further comprised of third data representative of a plurality of risk ceilings of a plurality of risk ceiling cells of a digital risk model of ceilings.

6. A device for generating risk-based flight path data, comprising:
 a path generator including at least one processor coupled to a non-transitory processor-readable medium storing processor-executable code and configured to:
  acquire navigation data representative of a plurality of waypoints;

acquire risk-based, elevation data based upon the navigation data and comprised of
    first data representative of a plurality of risk elevations of a plurality of elevation cells of a digital risk model of elevations, or
    second data determinative of a plurality of risk elevations of a plurality of elevation cells of a digital risk model of elevations, where
        a value for each of the risk elevations of the first data or the second data is based upon a plurality of surface elevations of a plurality of surface elevation cells of a digital elevation model adjusted for a level of risk of a crash of an aircraft and a cost corresponding to harm or injury to at least one person, at least one object on the ground, or both arising from the crash;
determine a risk-based flight path for the aircraft based upon the acquired navigation data, the acquired risk-based, elevation data, and a route generating algorithm;
generate flight path data representative of the risk-based flight path; and
provide the flight path data to at least one of an avionics system and a remote aircraft operator system, wherein
    a first avionics system comprised of at least one system of an autoflight system of the aircraft is configured to receive and employ the flight path data,
    a second avionics system comprised of a display system of the aircraft is configured to receive the flight path data and present risk-based flight path information to a viewer located inside the aircraft, or
    a remote aircraft operator system is configured to receive the flight path data and present risk-based flight path information to a viewer located outside the aircraft.

7. The device of claim 6, wherein
the second data is comprised of
    the plurality of surface elevations of the plurality of surface elevation cells of the digital elevation model, and
    a plurality of risk clearance altitudes of a plurality of risk clearance altitude cells of a digital risk model of clearance altitudes.

8. The device of claim 7, wherein at least a portion of the plurality of risk clearance altitudes is based upon a probability curve of a probability distribution function applied to the portion of the plurality of risk clearance altitudes.

9. The device of claim 7, wherein at least a portion of the plurality of risk elevations is based upon a probability curve of a probability distribution function applied to the portion of the plurality of risk elevations.

10. The device of claim 6, wherein the risk-based, elevation data is further comprised of third data representative of a plurality of risk ceilings of a plurality of risk ceiling cells of a digital risk model of ceilings.

11. A method for generating risk-based flight path data, comprising:
    acquiring, by a path generator including at least one processor coupled to a non-transitory processor-readable medium storing processor-executable code, navigation data representative of a plurality of waypoints;
    acquiring risk-based, elevation data based upon the navigation data and comprised of
        first data representative of a plurality of risk elevations of a plurality of elevation cells of a digital risk model of elevations, or
        second data determinative of a plurality of risk elevations of a plurality of elevation cells of a digital risk model of elevations, where
            a value for each of the risk elevations of the first data or the second data is based upon a plurality of surface elevations of a plurality of surface elevation cells of a digital elevation model adjusted for a level of risk of a crash of an aircraft and a cost corresponding to harm or injury to at least one person, at least one object on the ground, or both arising from the crash;
    determining a risk-based flight path for the aircraft based upon the acquired navigation data, the acquired risk-based, elevation data, and a route generating algorithm;
    generating flight path data representative of the risk-based flight path; and
    providing the flight path data to at least one of an avionics system and a remote aircraft operator system, wherein
        a first avionics system comprised of at least one system of an autoflight system of the aircraft is configured to receive and employ the flight path data,
        a second avionics system comprised of a display system of the aircraft is configured to receive the flight path data and present risk-based flight path information to a viewer located inside the aircraft, or
        a remote aircraft operator system is configured to receive the flight path data and present risk-based flight path information to a viewer located outside the aircraft.

12. The method of claim 11, wherein
the second data is comprised of
    the plurality of surface elevations of the plurality of surface elevation cells of the digital elevation model, and
    a plurality of risk clearance altitudes of a plurality of risk clearance altitude cells of a digital risk model of clearance altitudes.

13. The method of claim 12, wherein at least a portion of the plurality of risk clearance altitudes is based upon a probability curve of a probability distribution function applied to the portion of the plurality of risk clearance altitudes.

14. The method of claim 12, further comprising:
    acquiring aircraft performance data representative of an availability or unavailability of at least one aircraft system configured with at least at least one input factor from which real-time aircraft performance is determined, such that
        the plurality of risk clearance altitudes is modified, where
            the modification is based upon the availability or unavailability of the at least one aircraft system.

15. The method of claim 12, wherein at least a portion of the plurality of risk elevations is based upon a probability curve of a probability distribution function applied to the portion of the plurality of risk elevations.

16. The method of claim 12, further comprising:
    acquiring aircraft performance data representative of an availability or unavailability of at least one aircraft system configured with at least at least one input factor from which real-time aircraft performance is determined, such that
the plurality of risk elevations is modified, where
the modification is based upon the availability or unavailability of the at least one aircraft system.

17. The method of claim 11, wherein the risk-based, elevation data is further comprised of third data representative of a plurality of risk ceilings of a plurality of risk ceiling cells of a digital risk model of ceilings.

18. The method of claim 17, wherein at least a portion of the plurality of risk ceilings is based upon a probability curve of a probability distribution function applied to the portion of the plurality of risk ceilings.

19. The method of claim 17, further comprising:
acquiring aircraft performance data representative of an availability or unavailability of at least one aircraft system configured with at least at least one input factor from which real-time aircraft performance is determined, such that
the plurality of risk ceilings is modified, where
the modification is based upon the availability or unavailability of the at least one aircraft system.

20. The method of claim 11, further comprising:
acquiring aircraft performance data representative of an availability or unavailability of at least one aircraft system configured with at least at least one input factor from which real-time aircraft performance is determined, such that
the basis for determining the risk-based flight path includes the aircraft performance data.

\* \* \* \* \*